United States Patent [19]
Bielefeldt

[11] Patent Number: 5,843,211
[45] Date of Patent: Dec. 1, 1998

[54] METHOD AND APPARATUS FOR SEPARATING A HEAVIER PHASE FROM A LIGHTER PHASE IN A MATERIAL FLOW BY CENTRIFUGAL FORCE

[76] Inventor: Ernst-August Bielefeldt, 24582 Moorweg, 44 Bordesholm, Germany

[21] Appl. No.: 599,462

[22] Filed: Jan. 22, 1996

[30] Foreign Application Priority Data

Jan. 25, 1995 [DE] Germany ............. 195 02 202.5

[51] Int. Cl.⁶ .................................................. B01D 45/12
[52] U.S. Cl. ........................... 95/269; 95/271; 55/459.1; 55/459.2; 55/459.4; 55/459.5
[58] Field of Search .................. 55/459.1, 459.3, 55/459.4, 459.5, 418, 447, 459.2; 95/269, 271; 96/209, 206

[56] References Cited

U.S. PATENT DOCUMENTS

| | | | |
|---|---|---|---|
| 3,507,397 | 4/1970 | Robinson . | |
| 3,701,425 | 10/1972 | Laval, Jr. . | |
| 3,745,752 | 7/1973 | Gallaer | 55/418 |
| 3,907,528 | 9/1975 | Halter . | |
| 4,001,121 | 1/1977 | Bielefeldt | 55/459.1 |
| 4,065,277 | 12/1977 | Dahlem | 55/418 |
| 4,205,965 | 6/1980 | Bielefeldt | 55/459.1 |
| 4,265,640 | 5/1981 | Bielefeldt | 55/459.1 |
| 4,276,068 | 6/1981 | Laussermair et al. | 55/348 |
| 5,275,641 | 1/1994 | Tammera et al. | 95/271 |
| 5,310,480 | 5/1994 | Vidueira | 208/313 |

FOREIGN PATENT DOCUMENTS

| | | |
|---|---|---|
| 383052 | 5/1987 | Australia . |
| 539187 | 7/1955 | Belgium . |
| 0622123 | 11/1994 | European Pat. Off. . |
| 1340851 | 9/1963 | France . |
| 1480991 | 4/1967 | France . |
| 599671 | 7/1934 | Germany . |
| GM1456356 | 2/1939 | Germany . |
| 1195692 | 3/1966 | Germany . |
| 1407976 | 10/1969 | Germany . |
| 2743391 | 3/1979 | Germany . |
| 2743995 | 4/1979 | Germany ............. 55/459.1 |
| 3049752 | 2/1981 | Germany . |
| 2945951 | 5/1981 | Germany . |
| 3615747 | 11/1987 | Germany . |
| GM8717727 | 3/1990 | Germany . |
| 274220 | 6/1951 | Switzerland . |
| 414561 | 12/1966 | Switzerland . |

OTHER PUBLICATIONS

Article entitled "Eine neue Hydrozyklonart" (A New Type of Hydrocyclone) by L. Simek; vt Industrielle Praxis; vt Verfahrenstechnik, vol. 11, (1977) No. 1, pp. 19, 20, 22, 24.

*Primary Examiner*—Jay H. Woo
*Assistant Examiner*—Robert Hopkins
*Attorney, Agent, or Firm*—W. G. Fasse; W. F. Fasse

[57] ABSTRACT

Phases of different densities are separated from each other in a vortex separator chamber. A primary flow to be cleaned drives a secondary vortex flow in the chamber. The primary flow is introduced into the chamber centrally between the chamber ends through at least one flow inlet channel or bed having an axial length shorter than an axial chamber length and a radial inlet depth such that the primary flow is adapted to the secondary vortex flow. For this purpose the primary flow is fanned-out so that it smoothly merges into the secondary vortex flow close to the inner surface of the chamber wall to avoid turbulent flows and thus losses of the primary flow energy are reduced. Cleaned gas is sucked out through immersion pipes reaching centrally into the chamber from opposite ends. Heavier particles are removed by centrifugal force and discharged through gaps in the end walls of the chamber and/or through at least one peeling slot in the axial cylindrical or spirally shaped chamber wall.

32 Claims, 18 Drawing Sheets

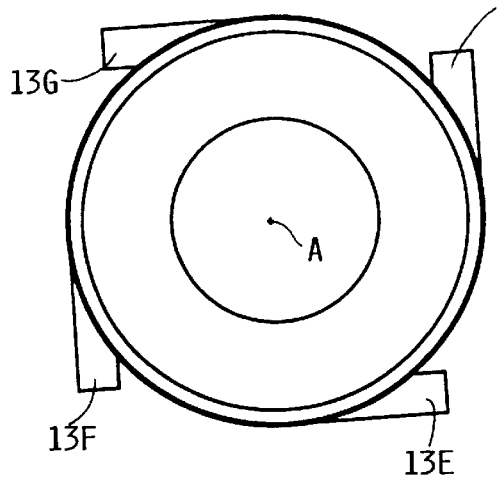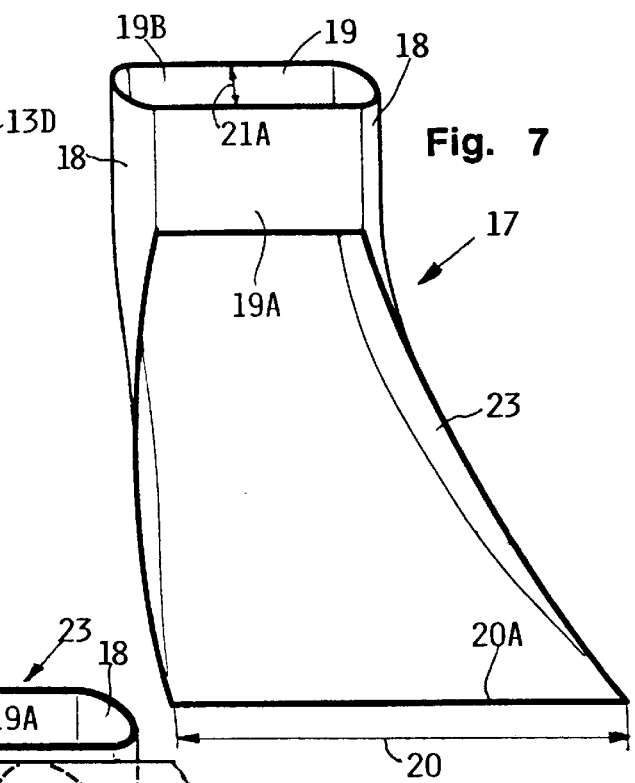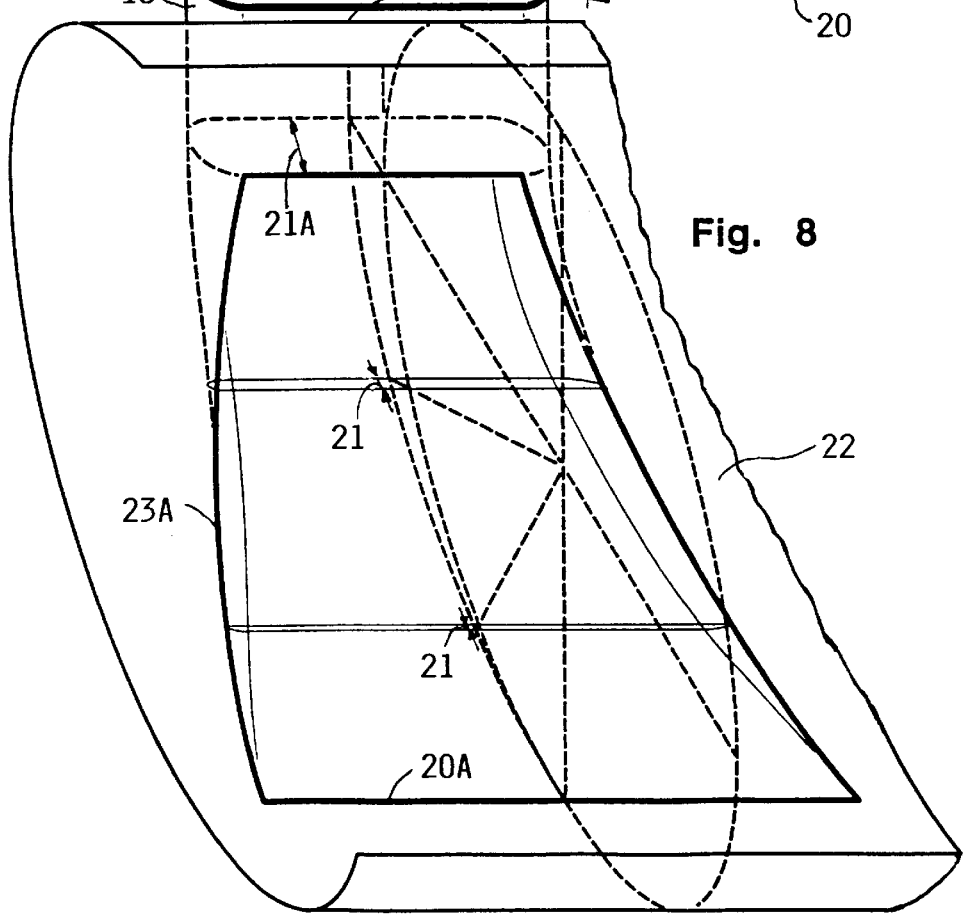

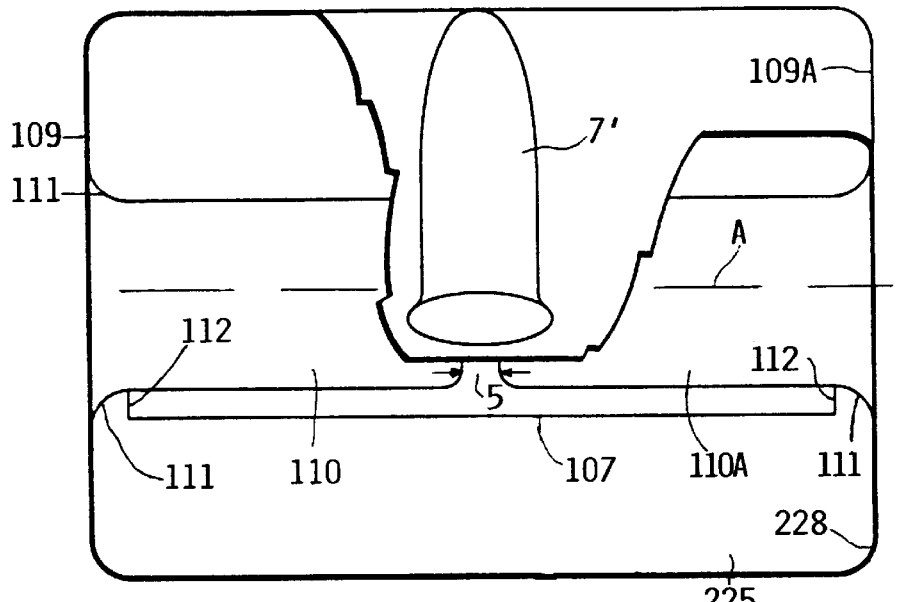
Fig. 36
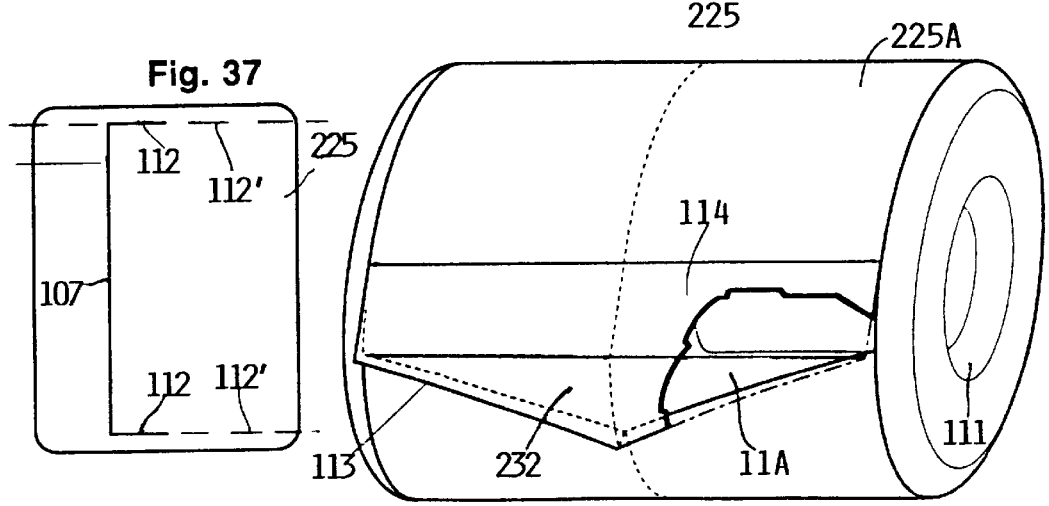
Fig. 37
Fig. 39
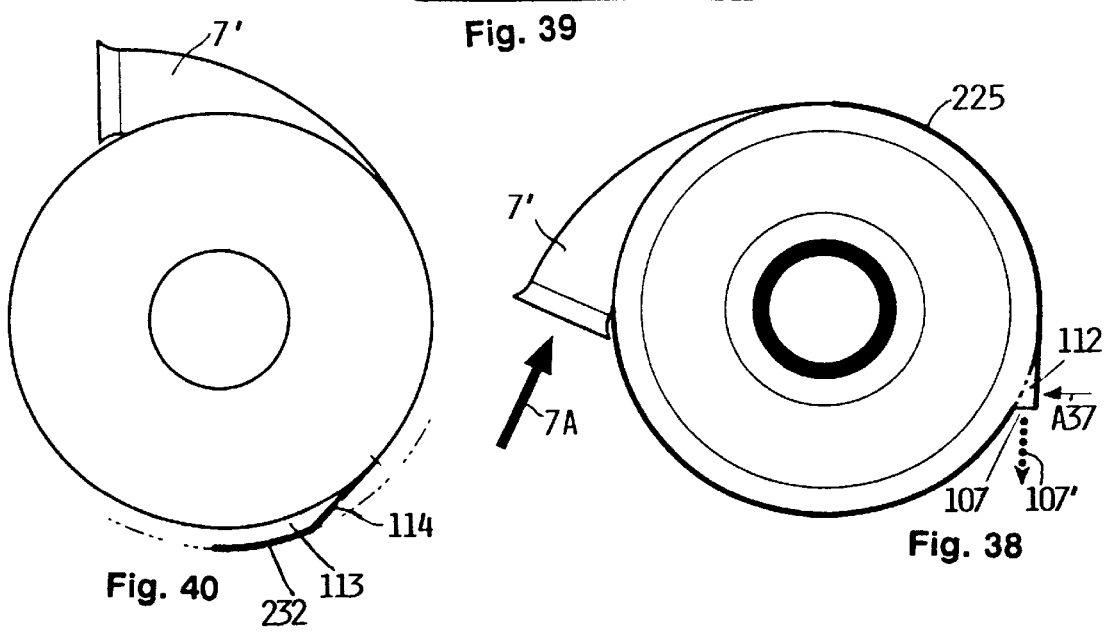
Fig. 40
Fig. 38

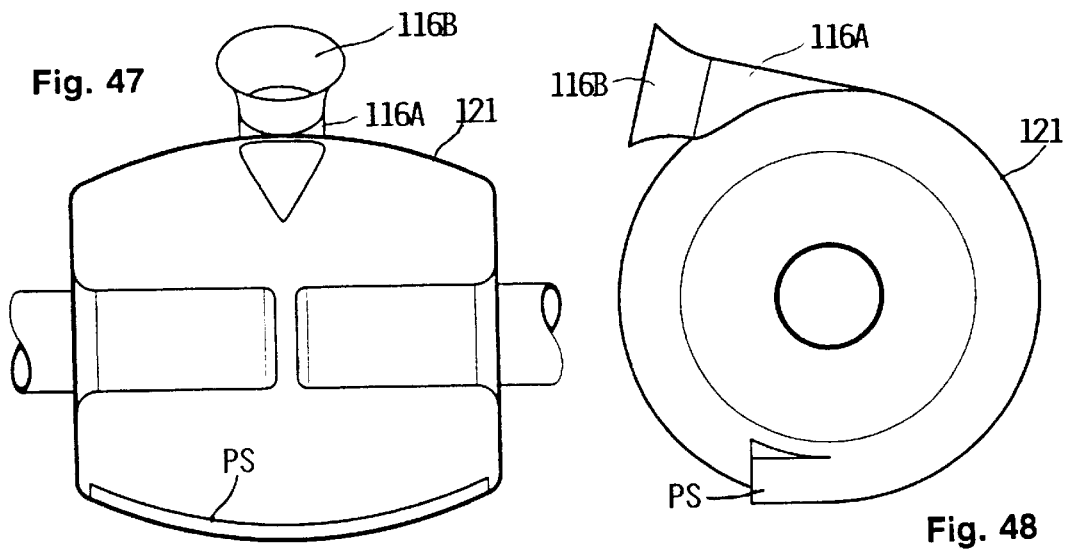
Fig. 47
Fig. 48
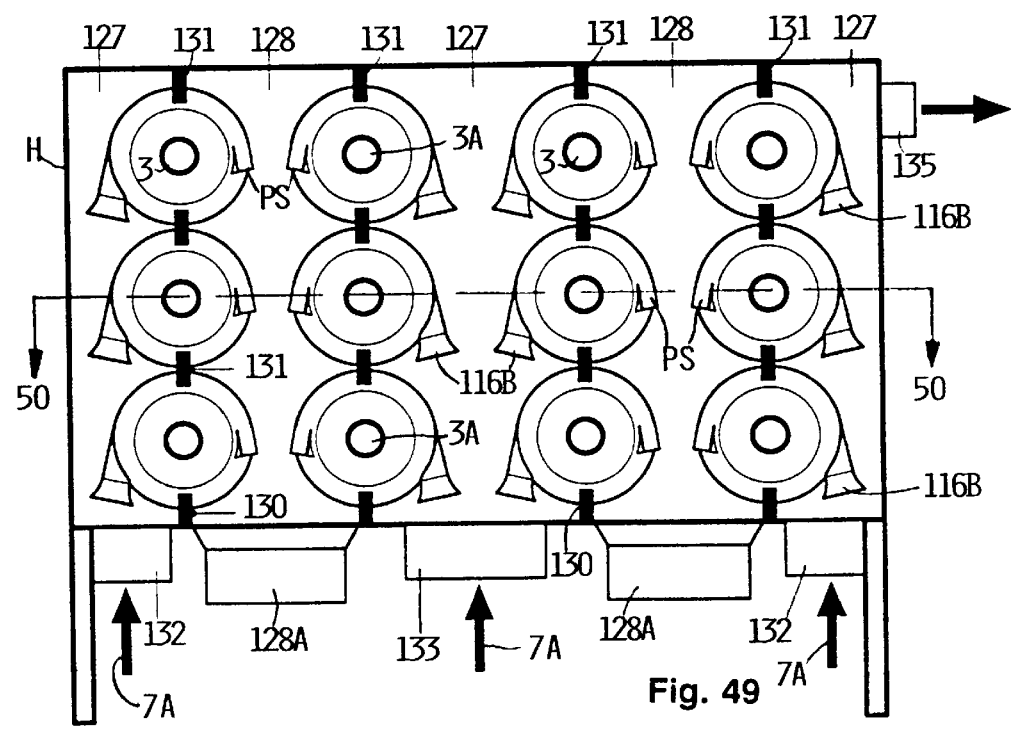
Fig. 49
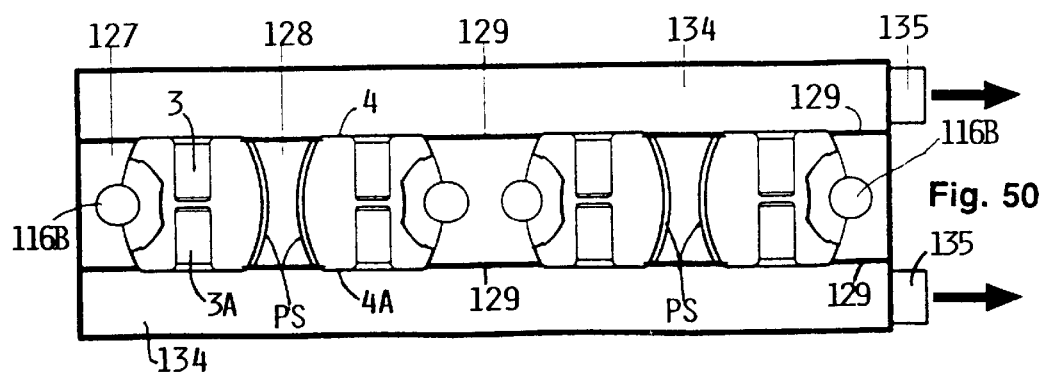
Fig. 50

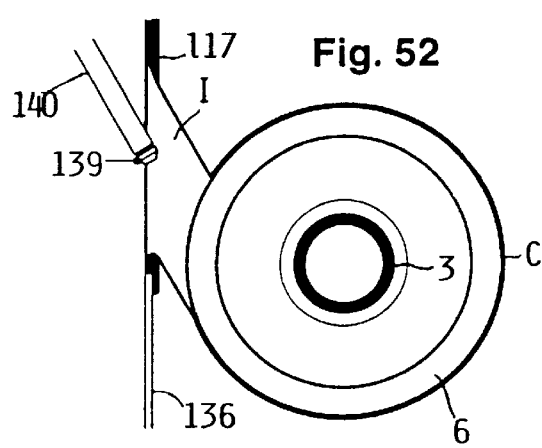
Fig. 52
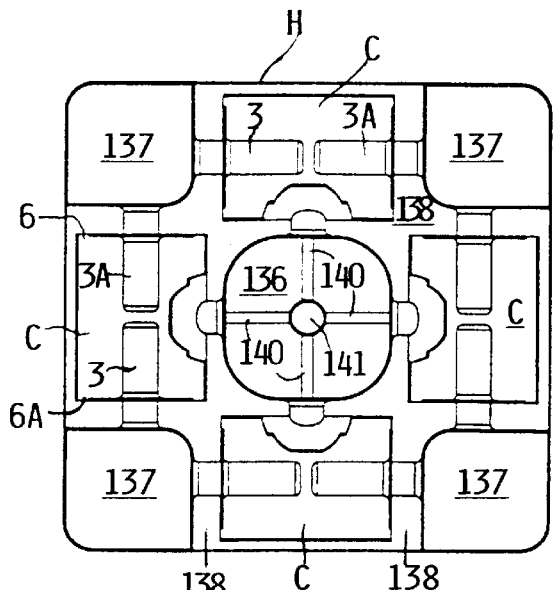
Fig. 51
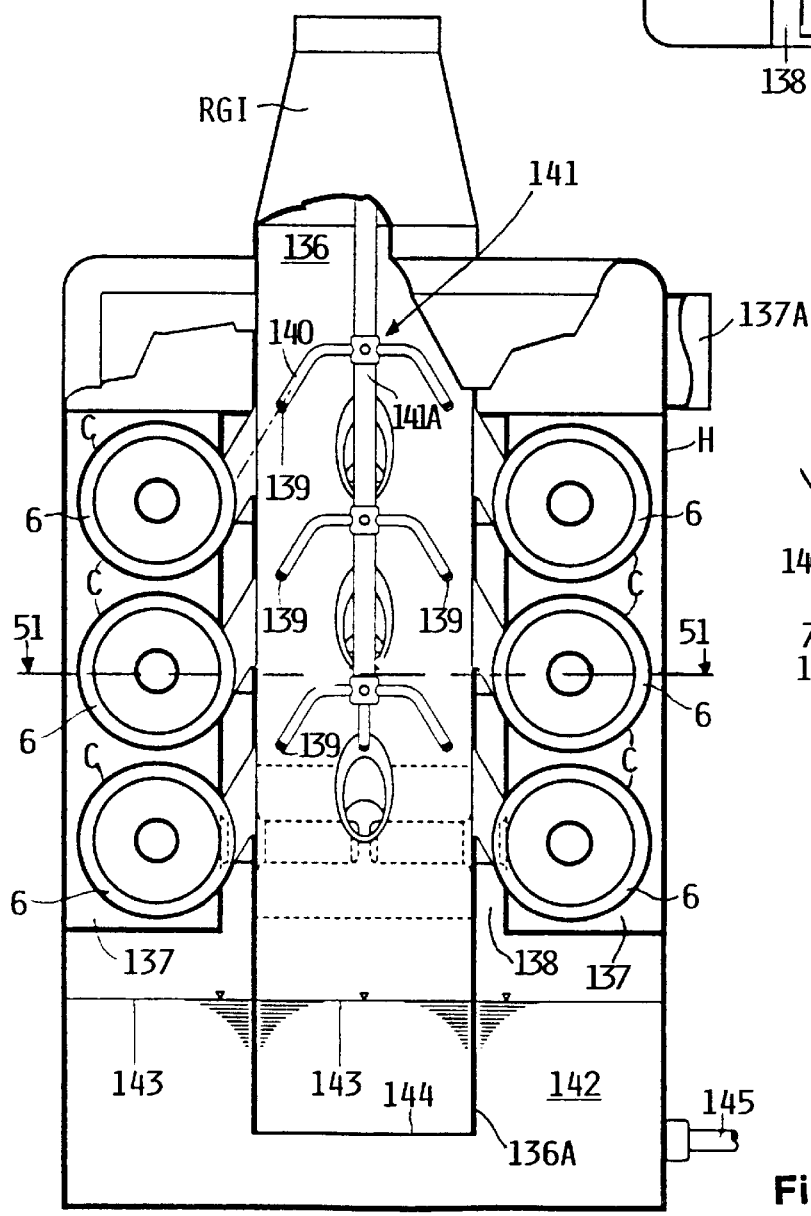
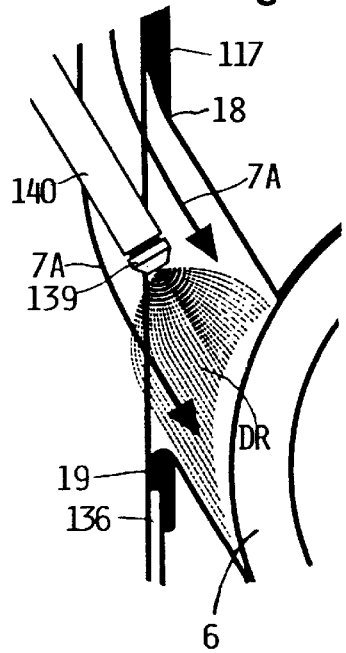
Fig. 53
Fig. 54

METHOD AND APPARATUS FOR SEPARATING A HEAVIER PHASE FROM A LIGHTER PHASE IN A MATERIAL FLOW BY CENTRIFUGAL FORCE

FIELD OF THE INVENTION

The invention relates to a material separating method by centrifugal force and to a vortex separator for performing the method.

BACKGROUND INFORMATION

Vortex separators including cyclone separators have a vortex chamber referred to herein simply as "chamber" or "separator chamber" in a housing with a central longitudinal axis, an axial wall and two end walls. One of two immersion pipes extends coaxially through each end wall into the chamber. The immersion pipes are axially aligned with each other. The pipe ends are mirror-symmetrically spaced opposite each other relative to a central radial plane through the chamber. A raw gas inlet extends tangentially into the axial chamber wall over the entire axial length of the chamber for separating a heavier phase from a lighter phase. A primary raw gas flow tangentially introduced into the chamber produces a secondary vortex flow in the chamber for separating a heavier phase from a lighter phase. Such chambers are used for example for the separation of dust particles out of a raw gas. However, in principle many different material phases can be separated from one another in such a chamber provided that a sufficiently large density difference exists between the phases. There is room for improvement with regard to enlarging the field of use for these separators.

Different types of separators differ from one another in the manner of the discharge of the separated material phase. In one type of separator the separated particles are carried out of the chamber in a remainder raw gas flow for transporting the separated particles. In another type, the separated particles are directly discharged through a discharge opening in the housing wall without a discharge flow. The present invention is applicable to both types of separators.

U.S. Pat. No. 4,205,965 (Bielefeldt) issued on Jun. 3, 1980, discloses a separator wherein a raw gas inlet is as long as the chamber in the chamber length direction. A remainder raw gas flow carrying out heavier particles passes through a discharge channel also extending along the entire length of the chamber. The chamber encloses two immersion pipes reaching mirror-symmetrically toward a central radial plane with a gap between the open pipe ends. The raw gas inlet has a flat rectangular cross-section extending over the entire axial chamber length for driving the secondary vortex flow. The gas phase having the lighter density is normally sucked out as clean gas by a suction fan connected to the immersion pipes. Two pairs of concentric immersion pipes may be used extending coaxially into the chamber, whereby clean gas is sucked off through the two central tubes while the lightest particles are sucked off through the ring space between the two coaxial tubes in each pair.

U.S. Pat. No. 4,265,640 (Bielefeldt) issued on May 5, 1981, discloses a separator with a chamber also equipped with axially extending mirror-symmetrically arranged immersion pipes. The discharge of particles of higher density takes place directly through discharge ring gaps in the chamber end walls. The raw gas inlet channel also has a flat rectangular inlet cross-section that extends over the entire axial chamber length. A discharge channel for raw gas is not provided. The ring gaps in the chamber end walls are positioned in the corners where axial flow is diverted into radial flow. Particles are discharged axially through the ring gaps under the influence of two superimposed centripetal accelerations. One centripetal acceleration is generated by the secondary vortex flow driven by the incoming raw gas primary flow. The other centripetal acceleration is generated near the end walls of the chamber by twice curved secondary flow. U.S. Pat. No. 4,265,640 also discloses so-called peeling slots in the chamber wall, through which separated particles travel tangentially out of the chamber.

Common to both conventional separators is the inlet channel with a flat rectangular cross-section extending over the entire axial chamber length. Such flat inlet channels for the raw gas primary flow have been considered to be essential for generating an effective secondary vortex flow. However, further research has shown that there is room for improvement with regard to the efficiency with which the primary flow drives the secondary vortex flow and with regard to broadening the field of use for such separators. Specifically, the wall friction between the primary flow and the inlet channel wall is large in conventional separators due to the large surface area contact which leaves room for improvement. Similarly, improvements are desirable with regard to primary flow energy losses caused by turbulent flows in the primary flow and in the interface between the primary inlet flow and the secondary vortex flow driven by the primary flow. As a result, conventionally it was not possible to fully utilize the energy potential in the primary flow for driving the secondary vortex flow. Moreover, large gradients in the velocity of the primary flow over its entire cross-section are undesirable because these velocity gradients cause large sheering forces which deagglomerate incoming particles thereby producing smaller particles which make separation even more difficult. As a result, only those smallest particles can be separated efficiently which have not been deagglomerated by the sheering forces in the primary flow. The smaller the particles, the more difficult becomes their separation.

OBJECTS OF THE INVENTION

In view of the above it is the aim of the invention to achieve the following objects singly or in combination:

- to avoid the above problems such as deagglomeration and undesirable flow turbulences to thereby reduce or eliminate factors which adversely influence the separation efficiency;
- to make vortex separators independent of adverse material characteristics such as deagglomeration tendencies so that even the finest particles can be effectively separated out of a gas flow;
- to increase the efficiency of vortex separators while maintaining conventional flow velocities to thereby increase the fields of use for such separators;
- to make the construction of vortex separators simpler so that manufacturing advantages are achieved by using serial or mass production methods for producing vortex separators and so that modular construction provides vortex chambers easily integrated into multi-chamber material separation systems;
- to positively influence the characteristics of the raw gas primary flow by the respective configuration of the raw gas inlet channel;
- to adapt the flow pattern of the primary flow to the flow pattern of the secondary vortex flow near the inner wall surface of the chamber; and
- to minimize or even avoid turbulence in the primary and secondary flows and in the interface between the primary and secondary flows.

SUMMARY OF THE INVENTION

According to the invention there is provided an apparatus for separating different material phases having different densities that can be separated by centrifugal force intermixed in a primary flow from each other, comprising a separator housing (H) having an axial wall (2) and radial end walls (4, 4A) enclosing a separator chamber (1; C, 116, 121) having a central longitudinal axis (A) and an axial chamber length (ACL), immersion pipes (3, 3A) reaching centrally from opposite chamber ends into said separator chamber with a central spacing (5) between inner ends of said immersion pipes for discharging or withdrawing a lighter phase through said immersion pipes out of said separator chamber (1; C), a discharge (6, 6A; 107, 113) out of said separator chamber for removing a heavier phase, said separator housing further comprising a flow inlet (7) penetrating said axial chamber wall (2) for blowing said primary flow into said separator chamber, said flow inlet (7) comprising an axial inlet length (AIL) that is smaller than said axial chamber length (ACL) and a radial inlet depth (RID) that is equal to or smaller than said axial inlet length (AIL) for adapting a primary driving flow pattern to a secondary vortex flow (11) in said separator chamber for driving said secondary vortex flow substantially without turbulence. Preferably, the primary driving flow pattern is a fan-out pattern (7B) adapted to a configuration of the secondary vortex flow for efficiently driving the secondary vortex flow substantially without turbulence.

Preferably, the axial inlet length (AIL) and said radial inlet depth (RID) satisfy the condition:

$$1 \geq \frac{RID}{AIL} \geq 0.01,$$

while the axial chamber length (ACL) is always larger than the axial inlet length (ACL>AIL). In a preferred embodiment the ratio AIL to RID is approximately one, or one, for example where the inlet is a square or circular pipe section.

According to the invention there is further provided a method for separating different material phases having different densities that can be separated by centrifugal force intermixed in a primary flow (7A), from each other in an apparatus as set forth above. The method of the invention comprises the following steps:

(a) feeding a primary flow through a flow inlet into a separator chamber midway between chamber end walls for generating and sustaining a secondary vortex flow in said separator chamber;

(b) limiting an axial dimension (AIL) and a radial dimension (RID) of said primary flow in said flow inlet to form a primary driving flow pattern symmetrically relative to a central radial plane (CRP) through said separator chamber;

(c) adapting said primary driving flow pattern to said secondary vortex flow radially outwardly near an inner surface of the axial housing wall so that primary flow impulse losses are reduced; and (d) configuring a flow cross-sectional area of said primary flow so that flow velocity gradients within said primary flow are kept small in a predetermined range of flow velocity gradients, whereby primary flow impulse losses are further reduced and all primary flow impulse losses are minimized due to the prevention of turbulences.

Preferably, the velocity gradients are kept small within the flow cross-sectional area of the primary flow and in an interface between the primary driving flow pattern and the secondary vortex driven flow close to the inner wall surface of the axial housing wall to reduce or eliminate turbulence thereby keeping impulse losses to a minimum. It has been found to be best if these velocity gradients are kept so small that shearing forces are avoided that could otherwise comminute or tear particles to be separated, for example fly ash particles that have a small material strength.

BRIEF DESCRIPTION OF THE DRAWINGS

In order that the invention may be clearly understood, it will now be described, by way of example, with reference to the accompanying drawings, wherein:

FIG. 6 is a schematic cross-section through a separator having at least four pipe inlets distributed circumferentially;

FIG. 7 shows a perspective view of a flat pipe flow inlet for use in a cylindrical separator housing shown in FIG. 8;

FIG. 8 is a perspective view of a cylindrical housing partly cut away to show a curved substantially trapezoidal opening in the axial housing wall for the flow inlet of FIG. 7;

FIG. 36 shows a separator housing with a central pipe inlet and with a straight peeling slot in the axial housing wall opposite the inlet with the front part of the axial housing wall shown partly broken away;

FIG. 37 shows the back side of the housing of FIG. 36 with the straight peeling slot;

FIG. 38 is an end view of the separator of FIG. 36 in the direction of the longitudinal axis (A);

FIG. 39 is a perspective view of a separator housing with a V-shaped peeling slot in the axial housing wall;

FIG. 40 is an end view of the separator of FIG. 39 in the direction of the longitudinal axis (A);

FIG. 47 shows a separator with a barrel separator housing having a curved peeling slot;

FIG. 48 is an end view of the barrel separator housing of FIG. 47;

FIG. 49 is an elevational side view of a separator system with a plurality of barrel separator housings according to FIG. 47;

FIG. 50 is a horizontal section along section line 50—50 in FIG. 49;

FIG. 51 is an end view of a separator system with four cylindrical separator modules with axial dust discharge gaps;

FIG. 52 is an end view partly in section of a separator with a nozzle for injecting liquid droplets into the inlet;

FIG. 53 is an enlarged view of the injector nozzle according to FIG. 52 to show a droplet pattern; and FIG. 54 is an elevational view of a separator tower with a plurality of cylindrical chambers having dust discharge gaps and injector nozzles.

DETAILED DESCRIPTION OF PREFERRED EXAMPLE EMBODIMENTS AND OF THE BEST MODE OF THE INVENTION

Figure 1:
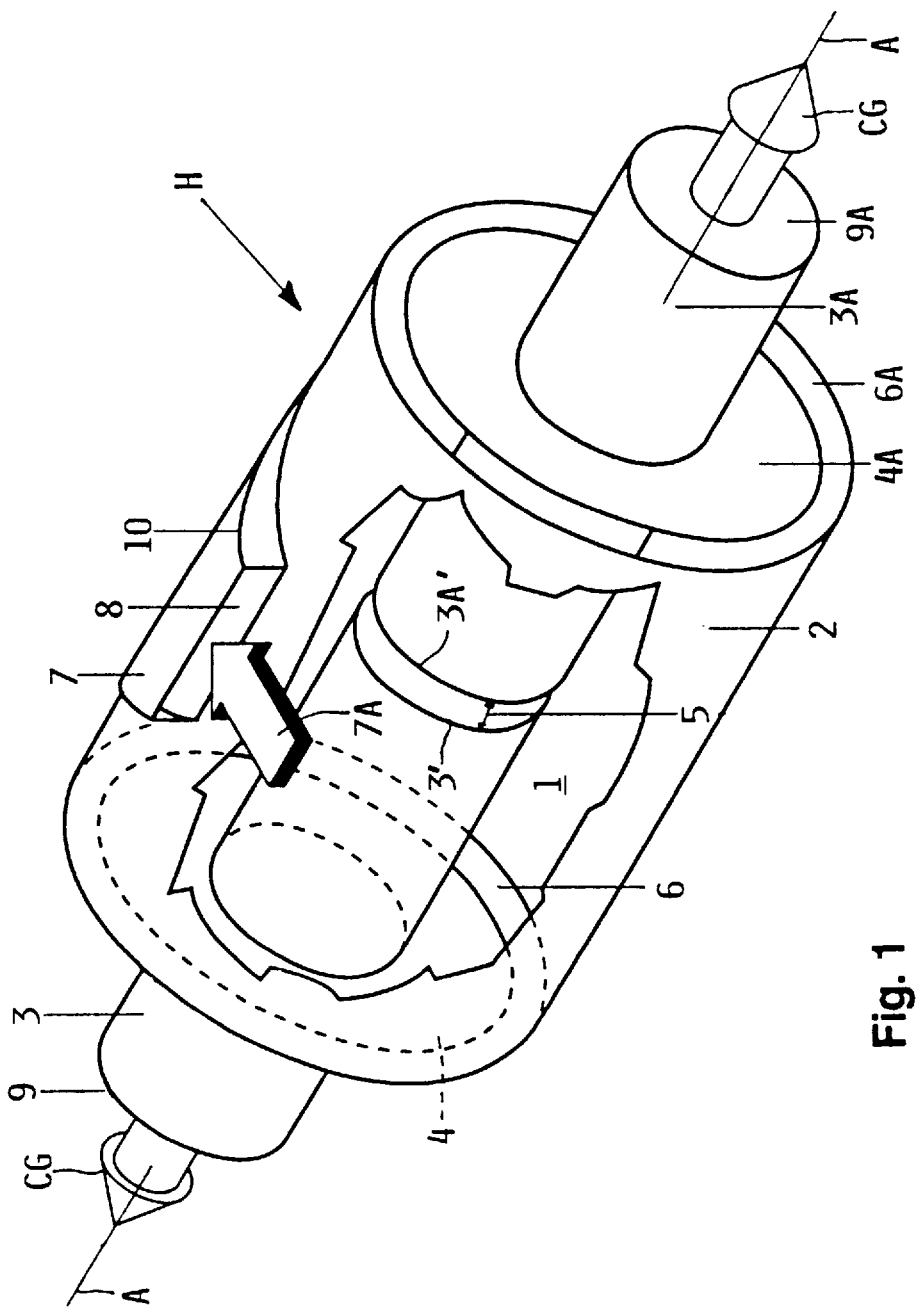
FIG. 1 is a perspective, schematic view of a vortex separator of the invention having a flow inlet of limited axial length and cross-sectional configuration for a raw gas primary flow.
Figure 2:
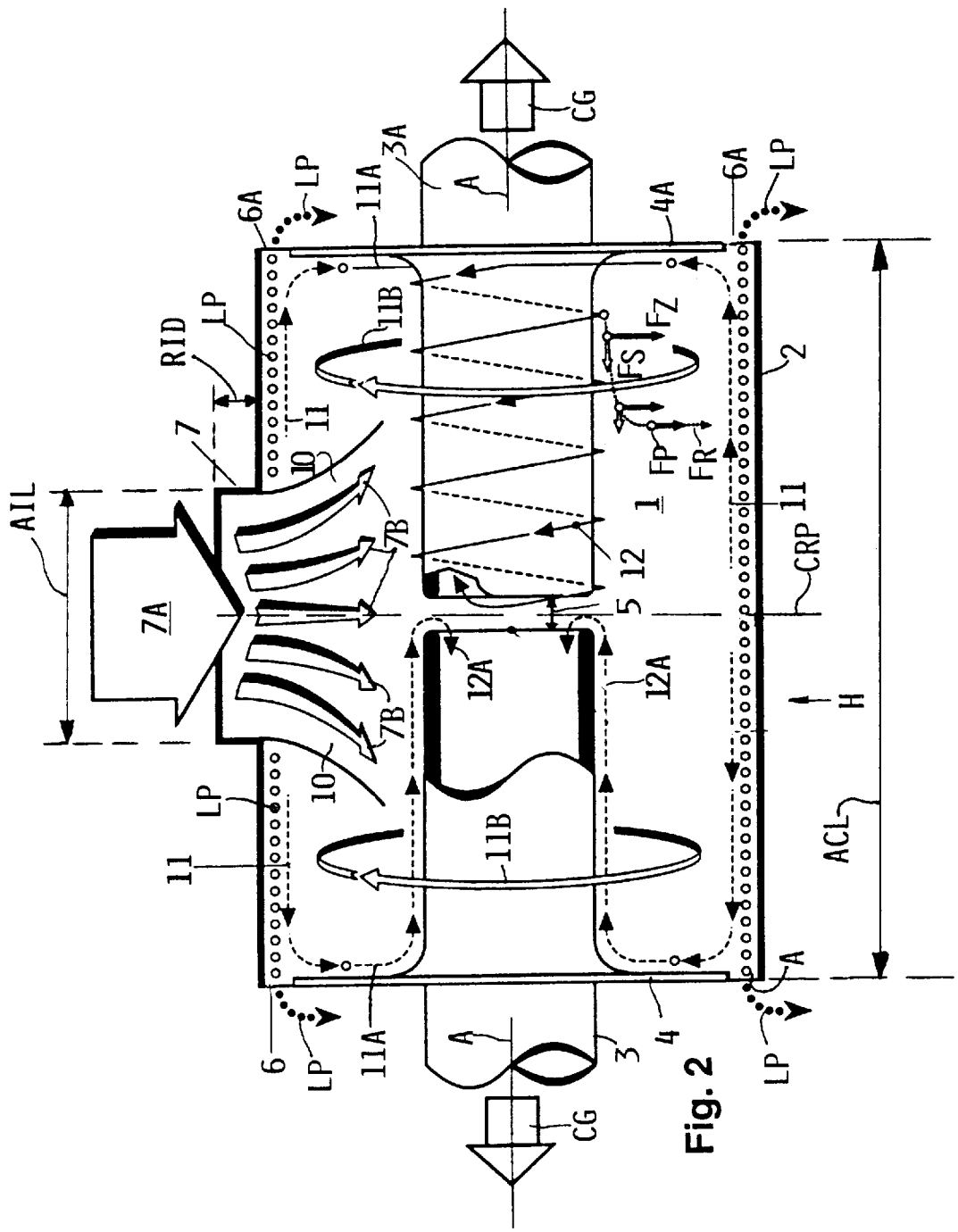
FIG. 2 shows the present primary inlet flow pattern in a schematic, longitudinal, axial sectional view of the separator of FIG. 1.

FIG. 1 is a perspective view of a vortex chamber 1 having a circular cylindrical configuration formed by a cylindrical housing H provided with a centrally positioned inlet 7 for a dust carrying primary flow 7A into the chamber 1. According to the invention the inlet 7 is positioned in a cylindrical axial housing wall 2 preferably symmetrically midway between end walls 4 and 4A of the housing H as best seen in FIG. 2. The inlet 7 has an inlet flow cross-sectional area 8 forming an inlet flow channel 10 that fans-out axially and in the circumferential direction of the housing H. Two immersion pipes 3 and 3A extend concentrically to the central longitudinal axis A of the chamber 1 into the housing H in axial alignment with each other to form a spacing 5 centrally and midway between the housing end walls 4, 4A in the chamber 1. Inner ends 3', 3A' of the immersion pipes 3, 3A form suction ports facing the spacing 5. A central radial plane CRP extends symmetrically midway through spacing 5 as shown in FIG. 2. Clean gas CG is sucked, by a fan not shown, into the immersion pipes 3, 3A and discharged through outlet ends 9, 9A of the immersion pipes 3, 3A connected to the suction fan. These pipes 3, 3A extend concentrically through the end walls 4, 4A. The housing end walls 4, 4A have a smaller diameter than the cylindrical housing 2 to form particle discharge gaps 6, 6A.

The dust carrying primary flow 7A, referred to herein simply as primary flow, enters the inlet 7 through the rectangular cross-sectional inlet flow area 8. The outflow of clean gas CG of substantially the same volume as the inlet flow, exits in equal volume proportions through the outlet ends 9, 9A. The dust separated by centrifugal action from the vortex flow in the chamber 1 emerges through both gaps 6, 6A. For this purpose it is preferred to mount the housing H so that the central chamber axis A extends horizontally in a system comprising a plurality of separator housings H. Dust transport devices which pick up the dust from the gaps 6, 6A are not shown since they are conventional.

As shown in FIG. 2, the inlet 7 has a simple structural configuration with an axial inlet length AIL and a radial inlet depth RID forming a rectangular flow cross-section 8 as an entrance to a flow channel 10 which fans out and opens into the chamber 1 through the wall 2 of the housing H. In the embodiment of FIGS. 1 and 2 the inlet 7 is attached to the outside of the circular, cylindrical axial housing wall 2 that has an inlet opening for this purpose. The configuration of the inlet 7 according to the invention with its flow channel 10 improves the driving capability of the primary flow 7A by adapting the shape of the primary driving flow pattern 7B to the shape of the secondary driven vortex flow pattern 11 in the chamber 1 close to the inner surface of the wall 2. The adaptation causes a fanning-out of the primary flow as shown by arrows 7B designating the primary fanned-out driving flow pattern 7B in FIG. 2. For this purpose the length of the inlet 7 in the direction of axis A and thus the axial inlet length AIL of the flow channel 10 increases axially and in the circumferential flow direction. Simultaneously the radial inlet depth RID decreases in the circumferential flow direction. The widening or fanning-out axially and in the flow direction adapts, according to the invention, the primary flow 7A or rather its fanned-out shape or driving pattern 7B to the local curvature of the natural secondary vortex flow or rather its secondary driven pattern 11 inside the chamber 1 next to the inner surface of the wall 2 of the housing H, whereby the driving efficiency of the inlet flow 7A is improved by avoiding turbulent flows.

The incoming primary driving flow 7A tangentially into a chamber 1 as just described, is converted by the configuration of the flow inlet 7 of the invention into the driving flow pattern 7B which generates the secondary vortex driven flow pattern 11 inside the chamber 1. The secondary vortex flow pattern 11 spreads axially along the inner surface of the wall 2 and then turns radially inwardly along the end walls 4, 4A. The circumferential gaps 6, 6A for the discharge of the heavier phase such as dust are positioned where the secondary flow 11 makes a first 90° turn radially inwardly for discharging heavier particles through gaps 6, 6A. The radial secondary flow 11A makes a further 90° turn axially inwardly where the secondary flow encounters the immersion pipes 3, 3A to flow inwardly in a helix flow 12 around pipes 3, 3A and then into the gap 5. Due to the relatively short axial length AIL of the inlet 7 at the inlet cross-section 8 and due to the fanning out in the axial and circumferential flow direction a smooth transition of the driving primary flow pattern 7B into the driven secondary flow pattern 11 near the chamber wall where wall friction is effective is achieved according to the invention, because the primary flow moves in the same direction as the secondary flow where both flows merge with little or no turbulence. This is an important advantage of the invention because by substantially avoiding or at least reducing turbulence between the driving primary flow and the driven secondary flow impulse losses that are caused by turbulent flow patterns are minimized. Turbulence is substantially avoided when flow impulse losses are measurably reduced.

The radial inlet depth RID of the inlet cross-sectional area 8 is substantially increased compared to the prior art. This feature provides another advantage of the invention because flow velocity gradients within the cross-section of the primary flow are reduced or minimized or even avoided which prevents deagglomeration. Further, flow velocity gradients or flow velocity differences in the interface between the primary and secondary flows are also minimized to reduce turbulence thereby increasing the driving efficiency.

The just described driving of the secondary flow pattern 11 by the primary driving flow pattern 7B results in two different separations. First, coarse particles are discharged through the gaps 6, 6A. Second, fine particles are separated in the two mirror-symmetrical helix flows 12, 12A around the pipes 3, 3A toward the area of the suction openings at the inner ends 3', 3A' facing the spacing 5.

FIG. 2 is an axial section through the chamber 1 and shows the above mentioned first and second particle separation. According to the invention the primary flow 7A fans out under the influence of the configuration of the flow inlet 7 as shown by the arrows 7B illustrating the primary driving flow pattern which drives the secondary vortex flow 11 flow pattern indicated by the axially extending arrows 11. The secondary flow 11 forms a ring layer vortex flow along the inner surface of the housing wall 2. In this area the secondary flow 11 is a boundary layer flow along the inner surface of the wall 2. One half portion of the secondary flow 11 moves with an axial flow component axially outwardly to the right and symmetrically away from the inlet 7. The other secondary flow half portion moves in the same symmetrical manner to the left. This symmetrical distribution of left and right half portions of the secondary flow 11 has reference to a central radial plane CRP that divides the chamber 1 enclosed in the housing H and all flow patterns in the chamber 1 symmetrically into two mirror-symmetrical portions. Both flow portions 11 turn radially inwardly at the respective end walls 4, 4A of the chamber 1 as indicated at 11A. A separation of the coarse, heavy, or large particles LP takes place where the flow 11 turns radially inwardly, thereby discharging particles LP through the gaps 6, 6A, whereby entry of the heavy particles LP into the area around the outer surfaces of the immersion pipes 3, 3A is avoided. The secondary flow 11 also has a circumferential flow component, whereby a helical secondary vortex flow 11B is formed near the inner wall surface of the wall 2. A further vortex flow is formed around the outer surface of the immersion pipes 3, 3A as symbolically indicated by the arrows 12, 12A. Arrow 12A is also intended to represent a vortex flow. In the radial direction near the end walls 4, 4A the secondary flow 11A is a spiral flow. Fine or light or small particles FP are separated in the area around the immersion pipes 3, 3A. The tangential axially symmetric introduction of the fanned-out primary driving flow 7B is superimposed on the secondary flow 11 to thereby generate a vortex flow under the influence of friction between the primary and secondary flows. However, due to the fanning-out the primary flow is smoothly aligned with the secondary flow to avoid harmful turbulence particularly at the interface between the two flows, whereby the driving efficiency is improved.

The flow around the immersion pipe 3A has been shown as a helical flow 12. The flow around and along the immersion pipe 3 has been shown merely by axial arrows 12A. However, there are two force components in the helix flow acting on the particles to separate the particles from the flow along both immersion pipes 3, 3A, namely an axial force component FS of the axial sink flow component and a radial centrifugal force component FZ of the rotational flow component in the helix flow which is the vortex flow. The conversion of the raw gas inlet flow 7A into a clean gas flow CG will now be described with regard to the separation of fine particles FP in the fine particle separation zone around the immersion pipes 3, 3A. The centrifugal radial component FZ tends to move even the fine particles centrifugally and thus substantially radially outwardly away from the immersion pipes 3, 3A. However, in the fine particle separation zone the fine particles are also subject to the axially directed sink flow component FS. The axial sink flow component FS is largest next to the outer surface of both immersion pipes 3, 3A, but becomes gradually smaller radially away from the immersion pipes, because the velocity of the sink flow in the boundary layer around the immersion pipes is largest in the axial direction near the immersion pipes, but then quickly decreases as the radius increases radially outwardly until the sink flow component FS approaches asymptotically toward zero. At the same time the centrifugal force FZ effective on the fine particles is also reduced as the radial distance from the central axis A increases, because the centripetal acceleration diminishes as the radial spacing increases. However, the centrifugal force FZ pre-predominates so that the fine particles FP also travel radially outwardly as indicated by the arrows FR designating the resulting force that transports the fine particles FP radially outwardly to return into the boundary layer vortex flow 11 close to the inwardly facing surface of the wall 2. Thus, the probability is increased that even the finest particles FP will be discharged through the slots 6, 6A. Any small or fine particles FP that continue travelling radially inwardly as shown at 11A, will be subjected repeatedly to the forces just described and thus discharged through the gaps 6, 6A together with the large particles LP. The clean gas CG is sucked into the inlet ports 3', 3A' of the immersion pipes 3, 3A facing the spacing 5.

Figure 3:
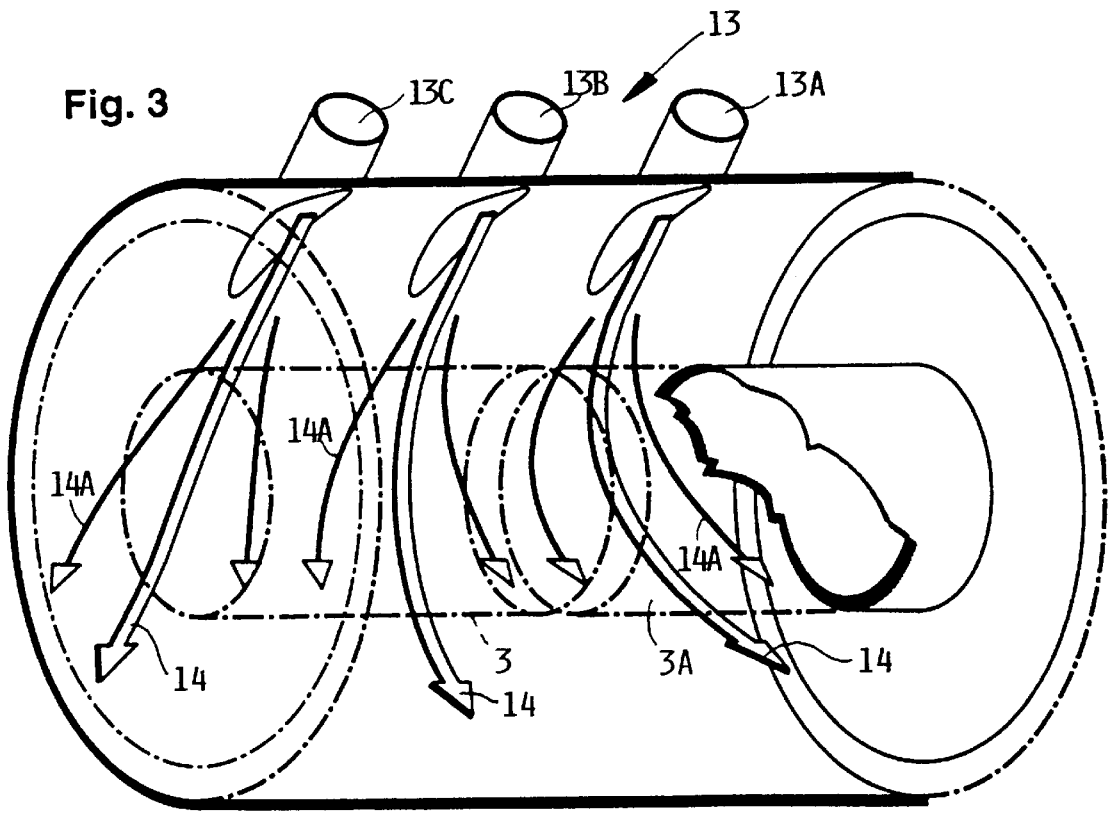
FIG. 3 is a perspective view of a separator with three pipe inlets.

FIG. 3 shows perspectively a simple construction of a flow inlet 13 having three inlet pipes 13A, 13B and 13C arranged in parallel to each other. Each of the inlet pipes 13A, 13B and 13C is a structurally simple component cut from standard circular pipe stock. For small chambers a single inlet pipe may be sufficient. The three pipes also generate a fanning-out driving flow pattern 14 that is adapted and symmetrically aligned with the secondary flow pattern 14A as described above. It has been found that with such groups of inlet pipes 13A, 13B, 13C any losses of the driving impulse of the primary flow are further reduced, thereby realizing even higher vortex flow velocities especially in the fine particle separation zone around the immersion pipes 3, 3A.

Figure 4:
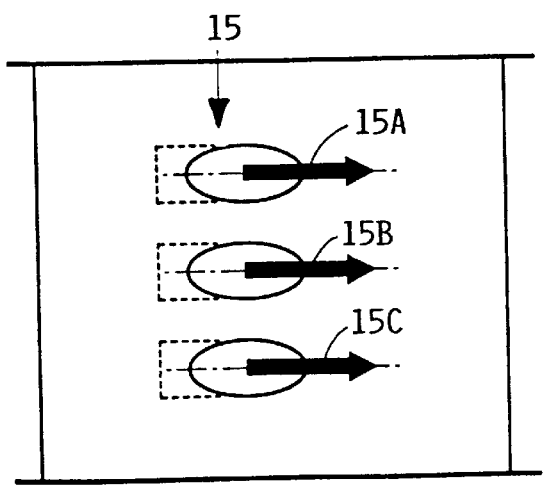
FIG. 4 shows a developed view onto a separator chamber with three pipe inlets arranged in parallel.

FIG. 4 shows a group of three inlet pipes 15 generating primary flows 15A, 15B and 15C extending in parallel and circumferentially into the chamber 1. The initially parallel primary flow components also tend to fan out somewhat and smoothly merge into the secondary vortex flow to reduce turbulence. The three inlets 15 are concentrated midway between the ends of the chamber.

Figure 5:
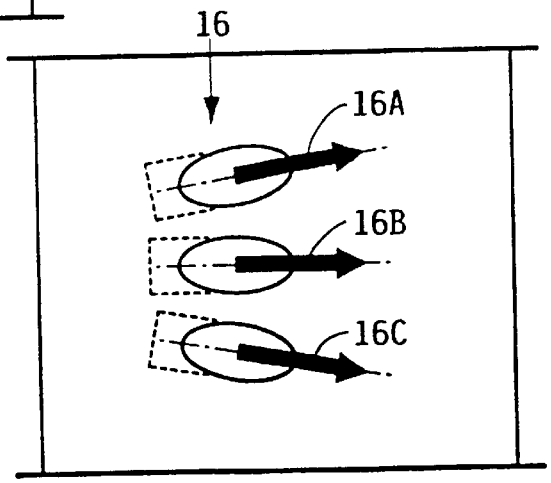
FIG. 5 illustrates a divergent arrangement of three pipe inlets to form a fan-out flow pattern.

FIG. 5 is a view similar to that of FIG. 4, however illustrating three inlets 16 generating primary flows 16A, 16B and 16C. Flows 16A and 16C provide a larger fan-out axially and circumferentially relative to the central flow 16B due to an angular positioning of the inlets 16. By adjusting the angle between the horizontal direction as indicated by the flow arrow 16B and the respective angle of flows 16A and 16C it is possible to control and thus adapt the driving primary flow to the flow pattern of the secondary flow 11 near the inner surface of the wall 2.

FIG. 6 shows schematically a chamber according to the invention having at least four flow inlets 13D, 13E, 13F and 13G uniformly distributed at equal angles around the longitudinal central axis A. At each of the four locations several inlets may be arranged as a group as shown in FIG. 3 in the axial direction A perpendicularly to the plane of the drawing sheet. These pipe inlets have substantial flow enhancing advantages since the diameter of the inlet pipe determines the radial inlet depth RID of the primary flow. The radial flow depth contributes to the efficiency of the driving of the secondary flow by the primary flow. Additionally, pipe inlets have manufacturing advantages because they can be simply cut from semi-finished standard pipe stock. Such pipe stock does not have to have a circular cross-section. Other cross-sectional configurations are also suitable for the present purposes.

FIG. 7 shows a perspective view of a pipe section formed as an inlet 17 from a pipe stock that has flat surfaces 19A and 19B connected laterally by rounded side surfaces 18 to form an inlet flow channel with a cross-sectional area 19 and a constant radial depth 21A between the walls 19A, 19B. A portion, not shown, of the flat pipe section has been cut away and the cut pipe section has been bent to form a curved flow channel that fans out in the axial direction and in the circumferential flow direction with an axial largest fan width 20 at the edge 20A. The curved flow channel has a radial depth 21 that becomes smaller in the circumferential direction and smaller toward the edge 20A. The inlet 17 has a curved trapezoidal opening 23 that tangentially connects to a respective opening 23A in the separator housing wall 22 a cut-off portion of which is shown in FIG. 8.

FIG. 8 shows the inlet 17 attached to the cylindrical housing wall 22, whereby the circumferentially extending opening 23A in the housing wall 22 has the same curvature as the curved trapezoidal opening 23 formed by the cut-off to form a flow channel into the chamber. The inlet 17 is connected to the chamber wall 22 by any conventional means, such as welding, riveting, bonding, or the like.

Figure 9:
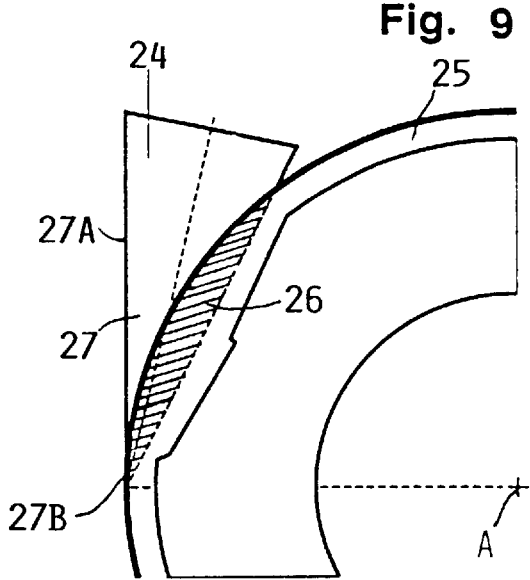
FIG. 9 is a sectional view in a radial plane, partly broken away, and in the direction of the longitudinal chamber axis (A) illustrating a pipe inlet providing a straight primary flow guide channel.
Figure 10:
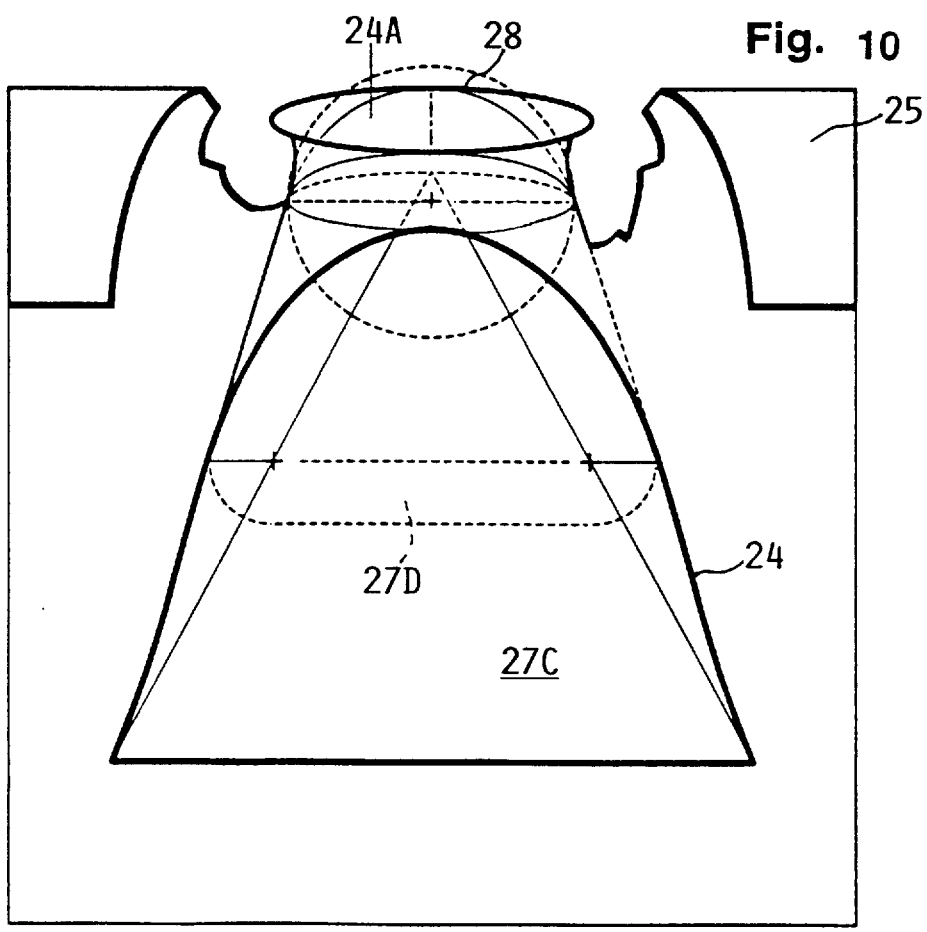
FIG. 10 shows the inlet of FIG. 9 attached to a cylindrical separator housing.

FIGS. 9 and 10 show a pipe inlet 24 of simple construction with aerodynamic advantages. An initially round pipe section is flattened at one end to form the triangular sectional shape 27 shown in FIG. 9. A hatched portion 26 is cut-off from the flattened pipe section and from the cylindrical housing wall 25 to attach the inlet 24 to a cut-out opening in the cylindrical housing wall 25 formed when portion 26 is cut-off. The flattened portion 27 has a straight flat surface 27A forming the outer wall of the inlet channel. The flattened pipe section is closed at 27B, but then opened again when the hatched portion 26 is cut off. The flattening simplifies the manufacturing procedure, since no attention needs to be paid to maintaining the lateral walls of the inlet rounded. Further, the inlet may be combined with a collar 28 that forms a nozzle inlet 24A as shown in FIG. 10. The flattening of the pipe section has the advantage that a broad flat inlet guide channel 27C is formed by simple production steps to provide the required axially symmetric fanout of the flow guide channel to advantageously adapt the primary flow 7A to the secondary flow 11. This axial flattening forms a fan-out that is larger than a fan-out formed by a cut-off cylindrical pipe section. The flattened guide channel 27C has a flow cross-sectional area 27D.

In the following text several so-called die stamped or drawn inlets will be described. The complete formation of an inlet into the axial housing wall of the vortex chamber 1 by deep drawing or die stamping has substantial construction and thus manufacturing simplifications and respective advantages. These advantages also apply to mounting such chambers in multi-chamber separator systems and to their maintenance. The drawing or stamping permits forming the inlets as recesses in the cylindrical axial housing wall so that the inlets do not project radially outwardly of the housing. This feature has the advantage that individual chambers may be mounted in circular holes of a support wall or walls at each end of a group of chambers, especially for forming a cleaning or separator system requiring a smaller total chamber volume. The individual cylindrical chambers mounted between two parallel support walls are interconnected by conventional simple rapid connectors for a quick release of at least one of the walls to provide access for example for maintenance work.

Figure 11:
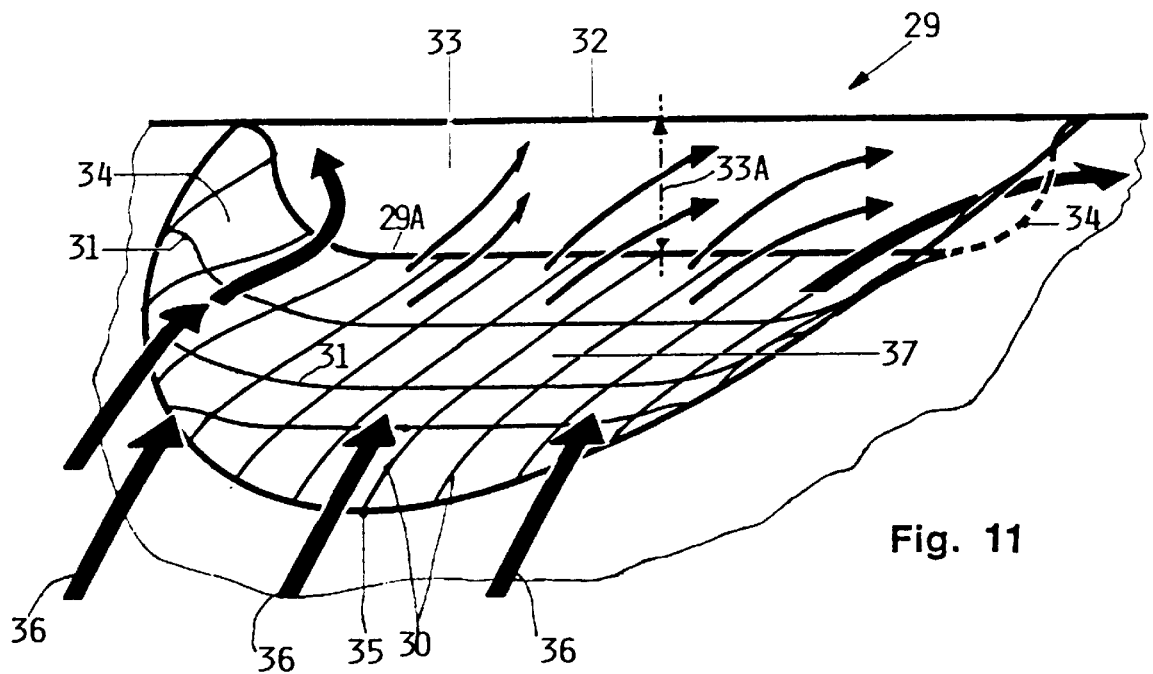
FIG. 11 shows schematically sheer lines or curvature lines (30, 31) of a double curved inlet channel formed by a stamping or drawing operation applied to the axial housing wall.

The perspective view of FIG. 11 shows a deep drawn inlet 29 in a cylindrical chamber wall 32. The inlet flow cross-sectional area 33 is now surrounded or enclosed by the edge of the chamber wall 32 and the trailing edge 29A of the inlet 29. Sheer lines or curvature lines 30, 31 illustrate an inlet flow channel bottom 37 with a first curvature 30 in the flow direction 36 into the chamber formed by wall 32 and a second curvature 31 crosswise to the flow direction 36. Such curvatures 30, 31 provide an optimal guiding for the primary flow 7A. The inlet flow cross-sectional area 33 is bounded by the edge of the cylinder wall 32 and by the inlet trailing edge 29A. The cylinder wall 32 provides a straight edge for the inlet flow area 33 at the top of the inlet 29 and the trailing edge 29A which is also a sheer line, provides a curved flow area boundary. This deep drawn inlet 29 reaches radially into the chamber and therefore deflects the secondary flow 11 inside the chamber partially radially inwardly. Thus, the radially inward dimension 33A at the inlet cross-sectional area 33 must be limited in such a way that the rotational symmetry of the secondary flow 11 is held within acceptable limits. For this purpose, the inlet flow channel bottom 37 is somewhat flattened radially outwardly while maintaining the entrance cross-section flow area 33 substantially rectangular except at the curved edges 34. A ratio between the axial length and radial depth of the inlet cross-section area 33 takes into account the need for a radially deeper primary flow to provide a more effective driving of the secondary flow for assuring higher separation capacities than in conventional separators. The substantially rectangular cross-section flow area 33 has lateral walls with curved edges 34 with a somewhat S-shaped configuration which extends into the bottom 37 as indicated by the cross sheer lines 31. The S-shaped configuration flattens all the way to the leading edge 35 of the inlet 29. The longitudinal sheer lines or curvature 30 are also somewhat S-curved to form the inlet channel bottom 37 for an aerodynamically optimal primary flow. The slightly S-shaped curvature of the sheer lines also has an advantageous influence on the secondary flow along the inside curved surface of the bottom 37 by reducing losses.

Figure 12:
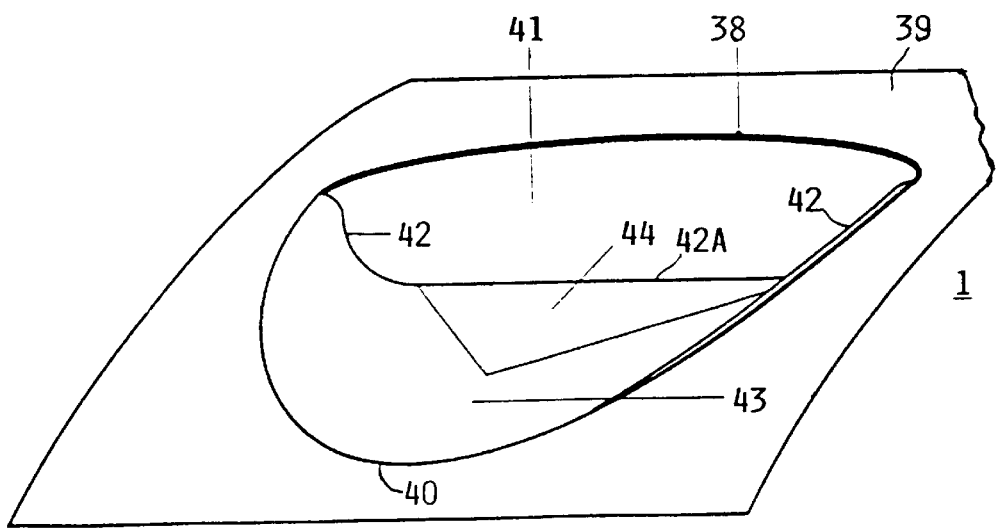
FIG. 12 shows a flow diverter modifying the inlet of FIG. 11.

FIG. 12 shows a modified drawn or stamped inlet channel 43 with a leading edge 40, a trailing edge 42A and an inlet opening 41 with a curved edge 38 in the wall 39 of the chamber 1. The inlet channel 43 is provided with a flow diverter 44 for enhancing the fanning-out of the primary flow toward curved side surfaces 42 of the inlet channel 43. The flow diverter 44 has flat, plane triangular surfaces and may be shaped directly out of the wall 39 by the drawing or stamping.

Figure 13:
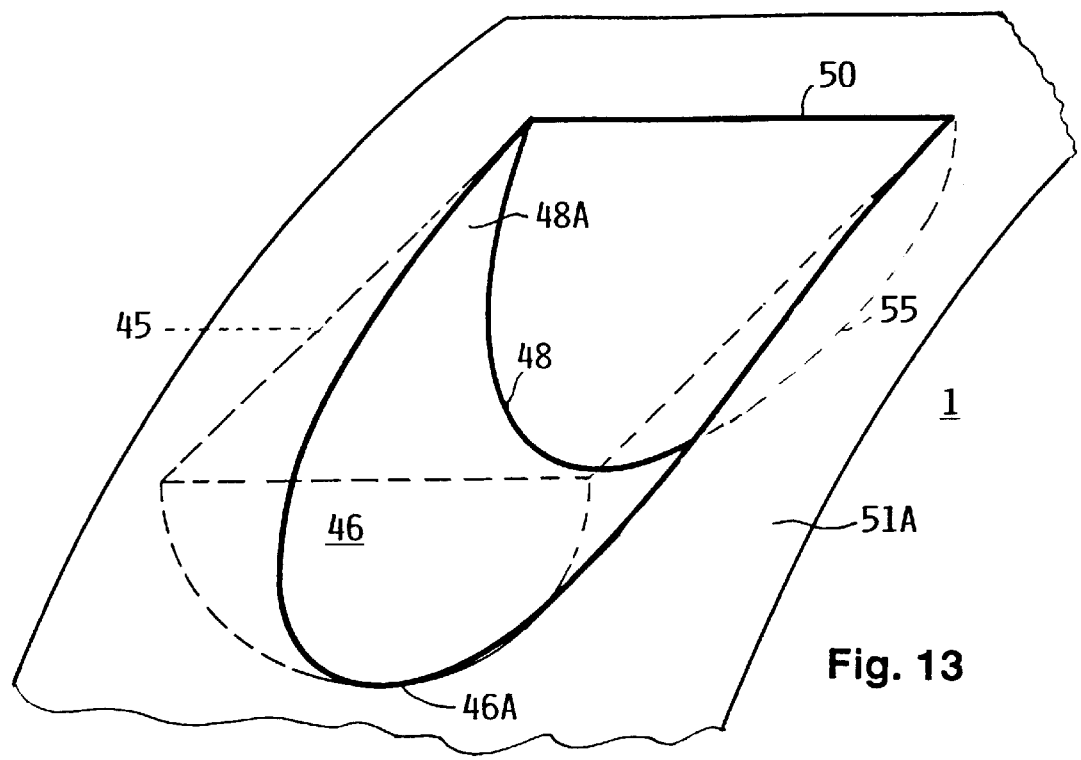
FIG. 13 is a perspective view of an inlet formed of semi-circular sectional stock.
Figure 14:
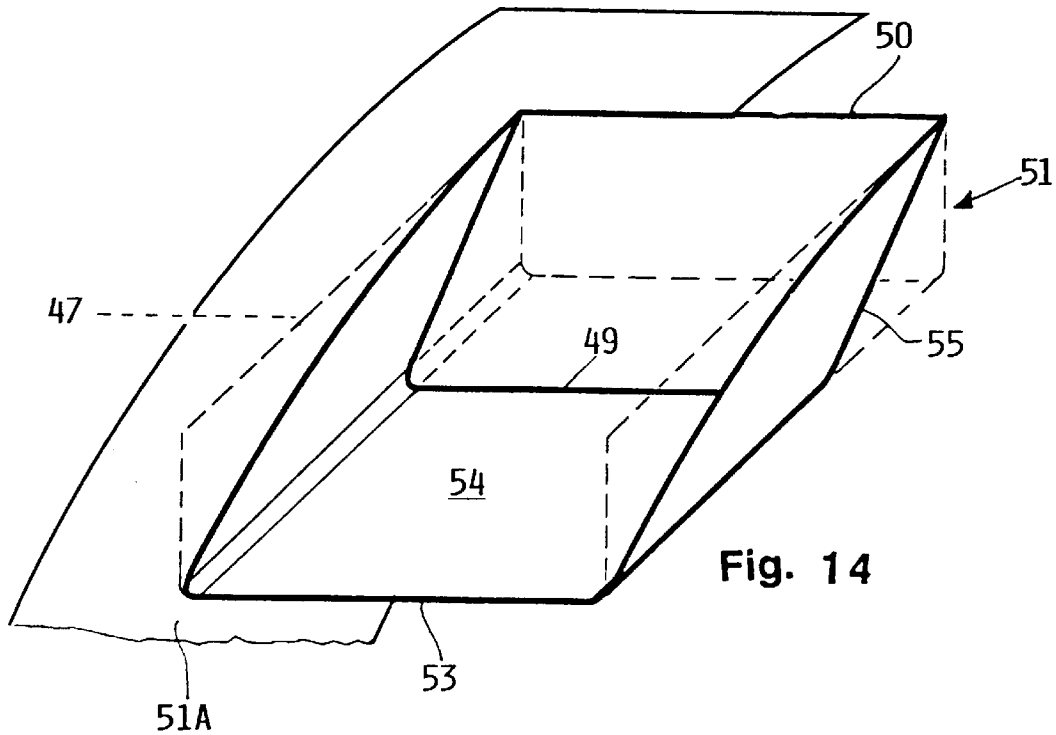
FIG. 14 shows a view similar to that of FIG. 13, however with an inlet formed of sectional stock having a U-profile.
Figure 15:
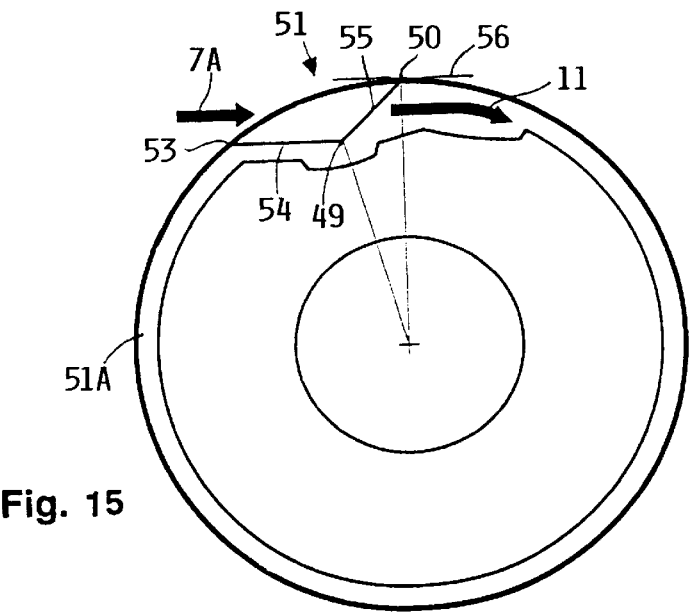
FIG. 15 shows a sectional view in a radial plane and in the direction of the longitudinal chamber axis (A) with an inlet according to FIGS. 13 or 14.

FIGS. 13, 14 and 15 show simplified versions of drawn or stamped inlet channels. These embodiments represent a compromise between a simplified construction of the inlet channels and the flow quality of the primary flow into the respective chamber. FIG. 13 shows an inlet channel 46 cut from semi-circular stock 45 to form a leading edge 46A and a trailing edge 48 by a cut-back 55. A straight edge 50 formed in a housing wall 51A of the chamber 1 forms a further trailing edge of the inlet channel 46. The channel 46 has curved side walls 48A leading to the trailing edge 48.

The use of semi-circular stock is not necessary. Other sectional stock may be used. For example FIGS. 14 and 15 show an inlet 51 cut from a relatively flat U-cross-sectional stock 47 to form an inlet channel 54 inserted into the cylindrical housing wall 51A of chamber 1. A cut-back 55 is positioned so that a tangent 56, seen in FIG. 15 through the trailing edge 50 in the housing wall 51A, extends in parallel to the bottom of the inlet channel 54, whereby a leading edge 53 of the inlet channel 54 merges into the surface of the wall of the cylindrical housing 51A. The cut-back 55 in FIG. 14 and a similar cut-back 55 forming the edge 48 in FIG. 13 have flow enhancing advantages. On the one hand, the length in the flow direction of the respective channel 46 and 54 is advantageously shortened thereby reducing friction between the primary flow 7A and the surface of the inlet channel 46, 54 respectively. Short inlet channels have the further advantage that, for example, corner flow losses, that may be caused by the U-profile 47 in FIG. 14 are reduced. The dimensions of the inlet channels are advantageously made as small as possible just sufficient to satisfy the flow conditions for a flow concentration of the primary flow at the entrance of the inlet and a proper flow guiding or fanning-out 7B of the primary flow 7A downstream of the inlet. The cut-back 55 in FIGS. 13 and 14 has the further advantage of avoiding an impact of the primary flow against the trailing edge 50 along the housing wall 51A. The primary flow 7A contacts the trailing edge 50 tangentially as best seen in FIG. 15, whereby impact losses are avoided. Without the cut-back 55 separation bubbles at and downstream of the edge 50 could cause impact losses due to the generation of a turbulence which is to be avoided because the turbulence could enter with the primary flow into the secondary flow 11 in the chamber with the primary flow whereby the separation capacity is reduced by turbulent diffusion in the separation zones. The trailing edge 50 can be a simple sharp edge as long as the primary flow does not impact on the edge 50.

Referring to FIG. 15, the primary flow 7A is caused to move approximately parallel to the bottom of the inlet flow channel 54. Preferably, the bottom of the inlet channel 54 should extend in parallel to the tangent 56 as seen in FIG. 15. In that case, the primary flow substantially does not impact on the trailing edge 50.

Figure 16:
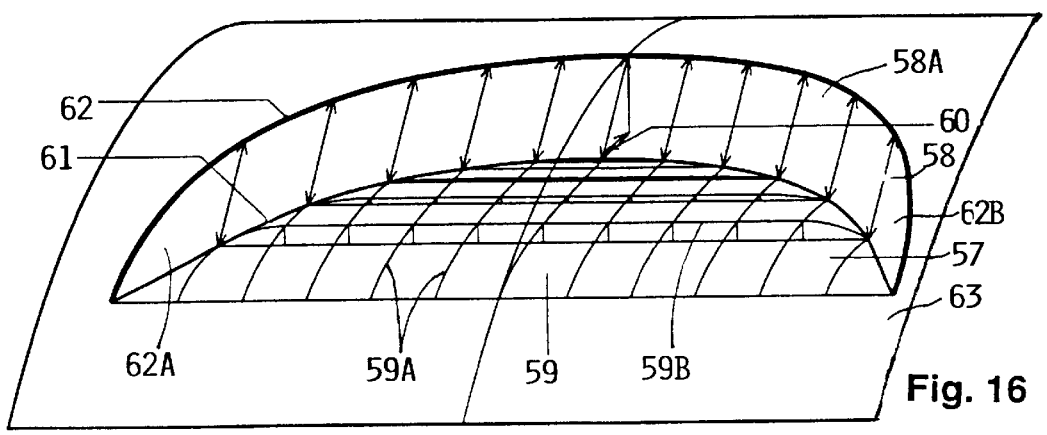
FIG. 16 shows a modified stamped or drawn inlet formed as a tongue deflecting a portion of the axial housing wall into the chamber.
Figure 17:
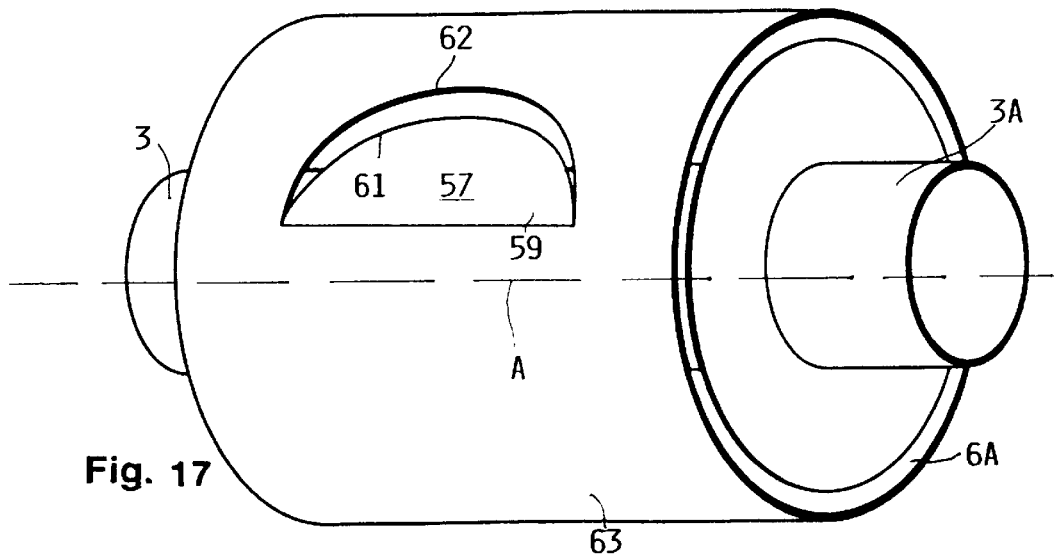
FIG. 17 shows a perspective view of a chamber with an inlet according to FIG. 16.
Figure 18:
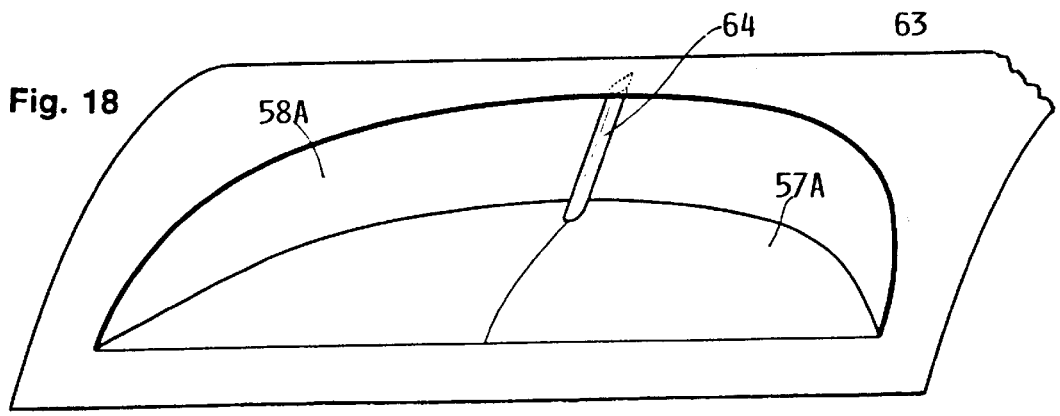
FIG. 18 illustrates a perspective view of an inlet according to FIG. 16 provided with a reinforcing post holding the inlet tongue in position.

FIGS. 16, 17 and 18 show modified embodiments with a drawn or stamped inlet channels formed by a tongue 57 which is preferably stamped directly out of the cylindrical housing wall 63. The tongue 57 has a trailing edge 61 and the housing wall 63 has a trailing edge 62. As shown by sheer lines or curvature lines 59A, 59B, the tongue 57 is so curved in two directions with a double curvature that an inlet gap 58A has a substantially constant width 58, except in the corners 62A, 62B of the gap 58A formed between the tongue 57 and wall 63. Preferably, the trailing edge 61 of the tongue 57 is cut back as shown at 60 so that the edges 61 and 62 are not aligned with each other in the radial direction relative to the longitudinal axis A. The double curvature provides the tongue 57 with a sickle shape of constant width 58. The mentioned cut-back 60 also contributes to a substantially uniform inlet gap width 58.

The perspective view of FIG. 17 shows the tongue 57 forming the inlet flow channel 59 illustrated in more detail in FIG. 16. Such an inlet does not form any projections outside the cylindrical housing wall 63 because the inlet is drawn or stamped into the wall 63.

FIG. 18 shows a modification in which the tongue 57A is strengthened by a post 64 connected at its lower end to the tongue 57A and at its upper end to the housing wall 63. Such a post 64 permits a precise gap width determination. Several such posts may be used along the gap at spaced intervals.

Figure 19:
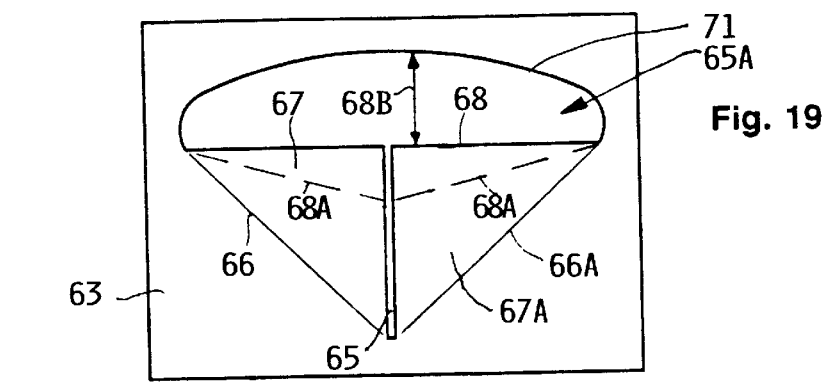
FIG. 19 shows a developed view of a stamped or drawn inlet with two tongue sections.
Figure 20:
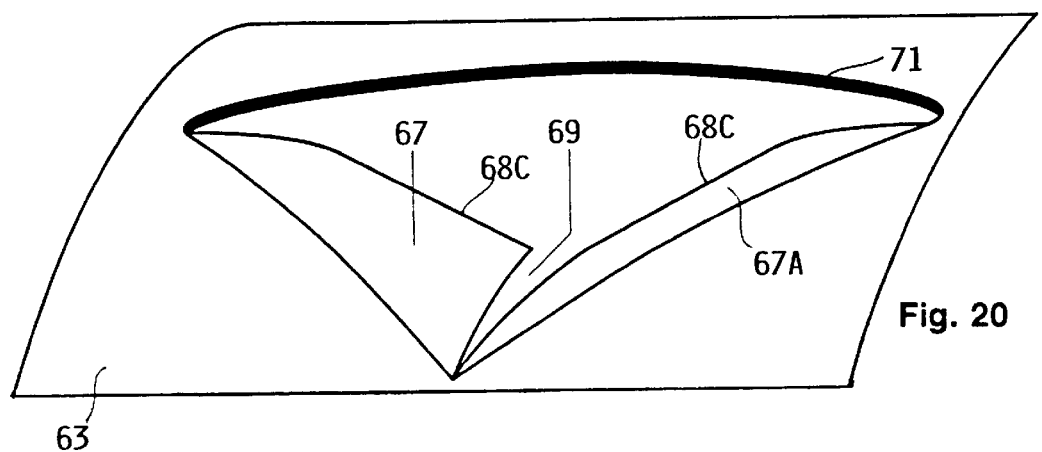
FIG. 20 is a perspective view of an inlet after deflection and curving both tongue sections according to FIG. 19.
Figure 21:
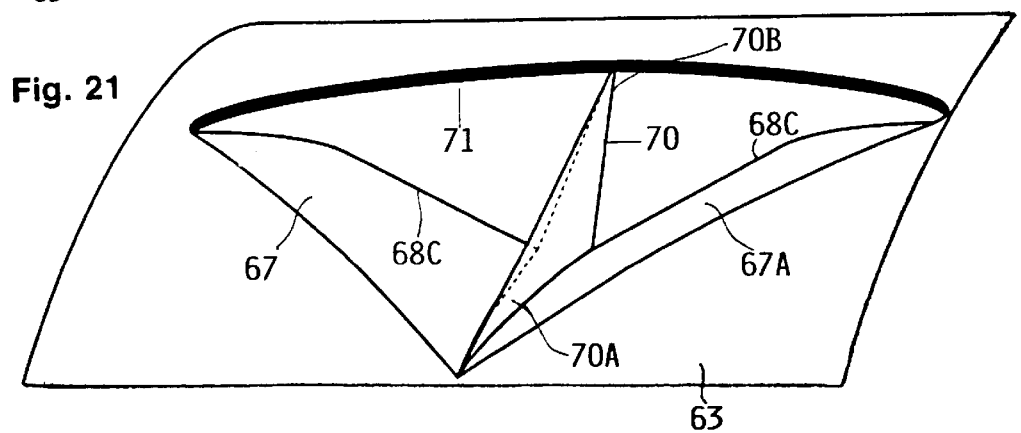
FIG. 21 is a perspective view similar to that of FIG. 20, showing a modified inlet with a support for both tongue sections.

FIGS. 19, 20, and 21 show further simple embodiments of drawn or punched inlets according to the invention. FIG. 19 is a developed flat view of an inlet channel 65A formed by a tongue having two tongue sections 67, 67A divided by a slot 65. The tongue sections 67, 67A are bent out of the housing wall 63 along inlet or leading edges 66 and 66A having a trailing edge 68 which is straight and extends in parallel to the generatrix of the cylindrical housing wall 63. Thus, a cut-back 68B is formed between the trailing edge 68 of the tongue sections and the curved trailing edge 71 of the inlet 65A in the wall 63. The cut-back 68B can be increased by cutting the inner or trailing edge 68 at a slant to form a slanted trailing edge 68A. The slot 65 is positioned centrally midway between the ends of the chamber so that the slot is in the central radial plane CRP shown in FIG. 2. The position of the trailing edge 68 or 68A is selected with due regard to an advantageous loss-free entrance of the primary flow into the chamber.

The fanning-out of the primary flow can be influenced by the bending of the tongue sections 67, 67A and by the shape of the tongue trailing edges 68 or 68A. FIG. 20 shows that the trailing edges 68C of the tongue sections 67, 67A are curved, thereby providing a simple way of adapting the fan-out of the primary flow to the secondary flow 11. Preferably, the tongue sections 67, 67A are bent into the chamber so that along the leading edges 66 and 66A smoothly curved flow transitions begin. The tongue portions closer to the center of the chamber preferably remain flat near the edges 68C, see FIG. 20 wherein a wedge-shaped gap 69 is positioned between the tongue sections 67 and 67A. This gap 69 may simply be left open since any flow losses that might be caused by the gap 69 are small.

FIG. 21 shows a modification of the embodiment of FIG. 20 with a support 70 preferably folded of sheet metal having a lower end 70A that closes the gap 69 and an upper end 70B connected to the trailing edge 71 of the inlet flow cross-section in the cylindrical housing wall 63, whereby the tongue sections 67, 67A are firmly held in place. In the embodiment of FIGS. 20 and 21 a cut-back between the trailing edges 68C and 71 is also formed as described above to reduce turbulence.

The formation of rotating step vortexes along the edges of inlet channels will now be described with reference to FIGS. 22 to 26. These vortexes are formed as a symmetric pair rotating in opposite directions along edges of the inlet channel. Such counter-rotating vortexes advantageously influence the primary flow in several respects. First, the velocity distribution of the primary flow is substantially constant in the primary flow over the inlet flow cross-sectional area of the primary flow, whereby deagglomeration is reduced or prevented. Further, the constant primary flow velocity advantageously influences the formation of the secondary vortex flow inside the chamber and leads to a larger volume of primary flow through the drawn or stamped inlets of relative small structural size. Second, the counter-rotating vortex flows advantageously influence an initial fanning-out of the primary flow still in the inlet channel which enhances the following axial fanning-out of the primary flow in the chamber to thereby smoothly adapt the driving primary flow to the driven secondary flow 11 in the chamber. Incidentally, the lateral or side vortex flows are preferably generated in inlet channels having a wedge or funnel shape.

Figure 22:
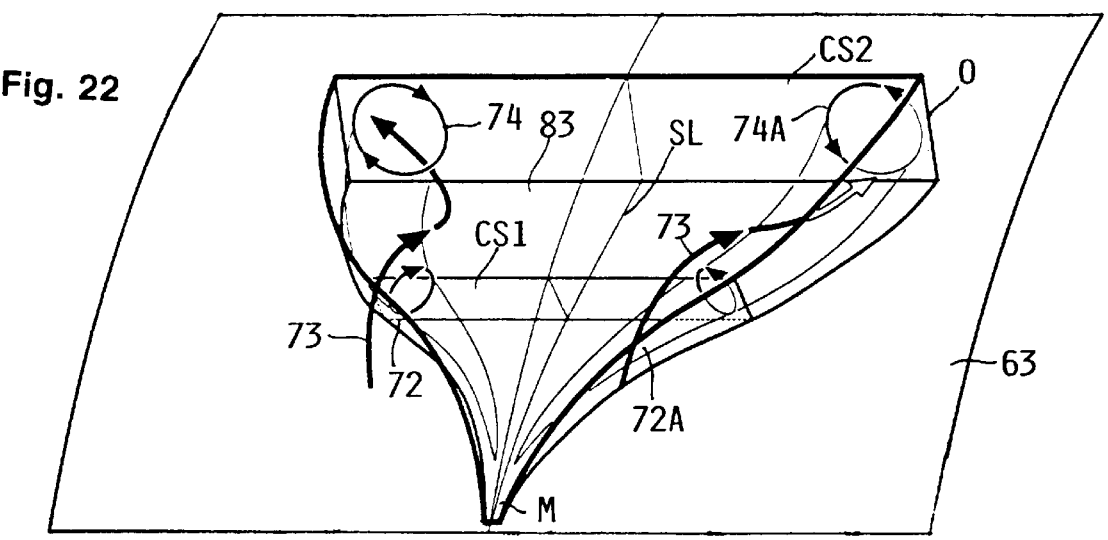
FIG. 22 is a perspective view of a funnel-shaped inlet forming an inlet channel for producing lateral step vortexes along edges of the primary flow through the inlet channel.

FIG. 22 shows a drawn-in stepped inlet channel of simple construction having a rectangular flow cross-section CS1, CS2 that increases from the mouth M of the inlet to the outlet O. Two step vortex flows 74, 74A are formed by the primary flow 73 travelling over steps 72, 72A in the inlet channel. The bottom 83 of the inlet channel has a curved configuration as shown by the sheer line SL.

Figure 23:
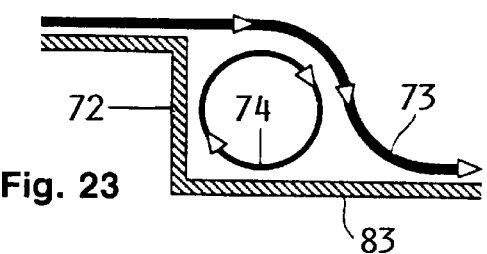
FIG. 23 is a sectional view through a step in the inlet channel showing the formation of a lateral step vortex.

FIG. 23 shows a sectional view through the corner formed by the step 72 and the vortex flow 74 formed in the corner by the primary flow 73. The resulting vortex flow 74 has an advantageous influence on the primary flow 73 with regard to its fanning-out and with regard to its uniform flow velocity distribution throughout the cross-sectional flow area of the primary flow and also on the guiding of the primary flow 73 through the inlet channel.

Figure 24:
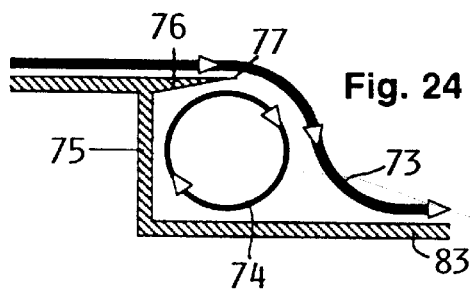
FIG. 24 shows a modified step in the inlet channel with a trailing edge for guiding the primary flow.

FIG. 24 shows a modification of a step 75 formed as a rectangular step in the inlet channel. The step 75 is provided with a flow off edge 76 having a sharp trailing edge 77 relative to the flow direction of the primary flow 73. The flow off edge 76 locally stabilizes the vortex flow 74. The sharp trailing edge 77 has the advantage that a turbulent flow off is avoided which is important because any turbulence introduced into the chamber by the primary flow reduces the separation capacity.

Figure 25:
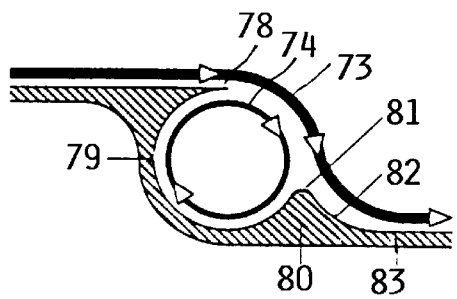
FIG. 25 shows a step in an inlet channel with a leading and trailing edge for guiding the primary flow.

FIG. 25 shows a step 79 with a preferably at least semicircular curved cross-section, a trailing edge 78, and a guide member 80 having a curved leading edge 81 relative to the flow direction of the primary flow, whereby the vortex flow 74 avoids corner flow losses because turbulence is avoided. The primary flow 73 glides over the edge 78 and is then guided by the leading edge 81 onto a curved surface 82 leading the primary flow 73 smoothly onto the flat channel bottom 83 of the lead-in channel. This construction with rounded corners, except for the sharp trailing edge 78, has the least flow losses in the guidance of the step vortexes and provides a most effective guidance of the primary flow through the inlet channel.

Referring further to FIG. 22, the sheer line SL shows that the bottom 83 of the inlet channel is slightly curved in the flow direction substantially circumferentially into the chamber formed by the wall 63. The channel bottom 83 in FIGS. 23 and 24 is also curved as just described in the flow direction inwardly. In FIG. 25 the channel bottom 83 is flat except for the slight curvature 82 along the channel edges.

Figure 26:
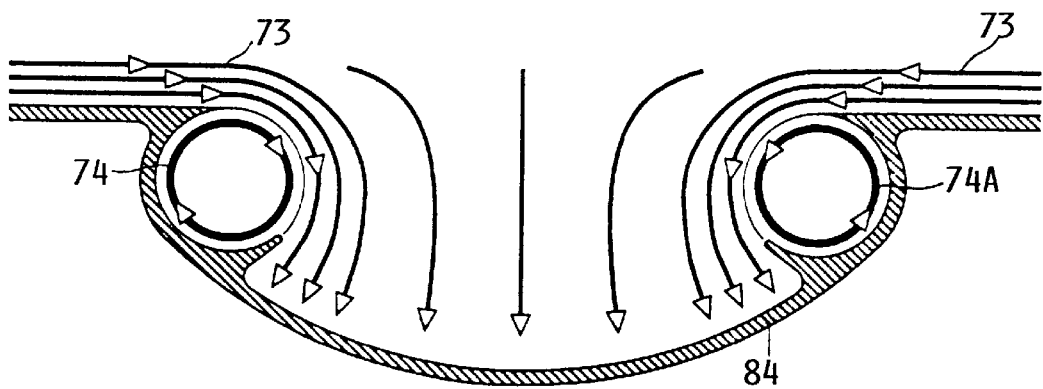
FIG. 26 shows a sectional view through a modification of the inlet channel according to FIG. 22 with a vaulted channel bottom.

FIG. 26 shows an inlet channel bottom 84 that is curved in the primary flow direction as shown by the sheer line SL in FIG. 22 and is additionally curved in the axial section radially inwardly as shown in FIG. 26. Such a double curvature as shown for the bottom 84 in FIG. 26 provides advantageously an enlarged cross-sectional flow area for the primary flow, whereby thicker primary flow jets are formed.

In the following, several inlets extending circumferentially around the housing enclosing the chamber will be described. These inlets have special flow dynamic advantages which facilitate the driving, by the primary flow of the secondary flow inside the chamber uniformly and with axial symmetry relative to the central radial plane CRP along the entire chamber circumference. The inlet structure achieves an advantageous integral adaptation of the fanning-out of the primary flow to the secondary vortex flow. These inlets provide a continuously circulating driving primary flow which has an advantageous influence on maintaining the rotational symmetry of the driven secondary vortex flow inside the chamber.

Figure 27:
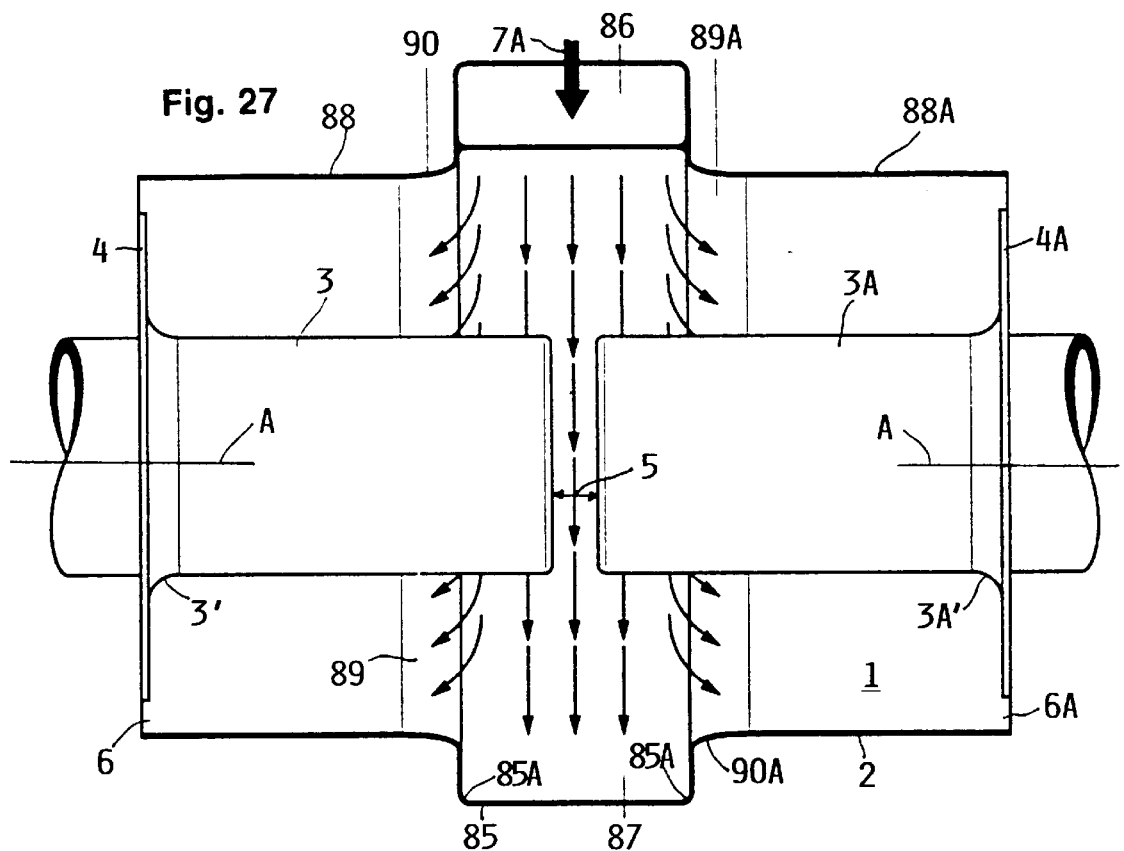
FIG. 27 is a schematic axial sectional view through a chamber with a spiral inlet for the primary flow extending centrally around the separator housing.
Figure 28:
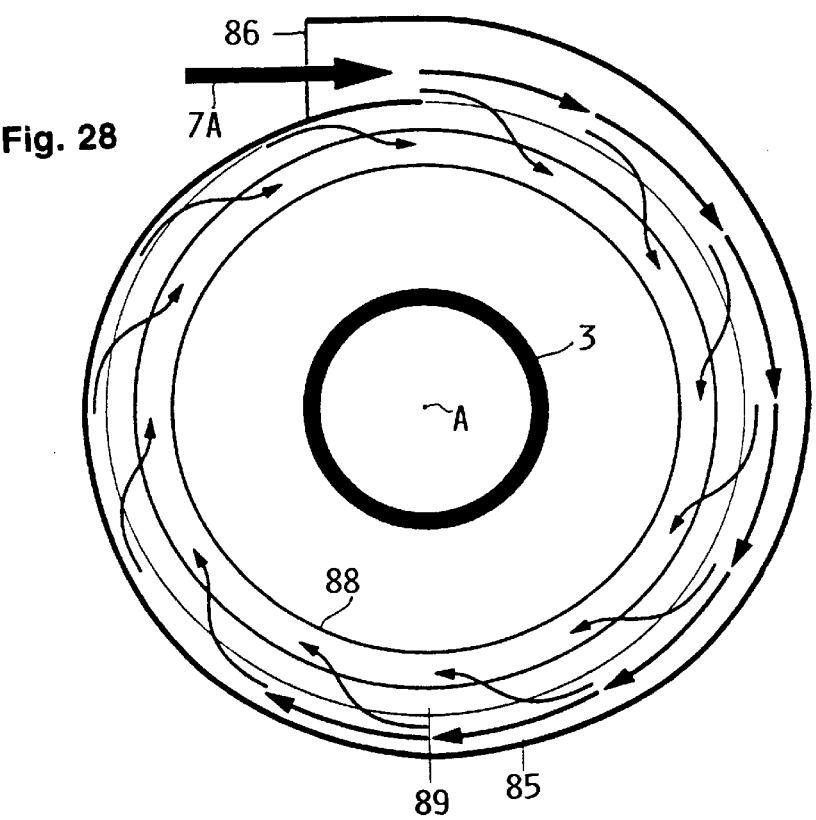
FIG. 28 is a sectional view in a radial plane and in the direction of the longitudinal axis (A) through the spiral inlet of FIG. 27.

FIG. 27 shows a view similar to that of FIG. 2 which is substantially an axial side view while FIG. 28 is a schematic sectional view through the central radial plane CRP in the direction of the longitudinal axis A also shown in FIG. 27 and centrally through the inlet 86.

Two housing sections 88 and 88A are arranged in axial alignment with each other and with a spacing between the sections 88, 88A. A spirally shaped inlet channel 85 is positioned coaxially in the spacing between the housing sections 88, 88A. A first curved transition collar 89 joins one side of the inlet channel 85 to the housing section 88. A second inlet collar 89A joins the opposite side of the inlet channel 85 to the housing section 88A. The collars 89 and 89A have respective curves 90 and 90A. The inlet channel 85 has an inlet cross-sectional flow area 86 at its entrance. The primary flow 7A enters through the entrance area 86. The inlet channel 85 forms a spiral housing with a rectangular flow cross-sectional area 87 with rounded corners 85A. The area 87 decreases around the circumference of the chamber away from the entrance area 86. The flow cross-sectional areas 87 are open radially inwardly so that the primary flow can pass axially around the curves 90 and 90A of the connecting collars 89, 89A. The collars 89, 89A form distribution and flow guide chambers of rotational symmetry whereby the curves 90, 90A cause the primary flow to merge into the secondary vortex flow with a rotational and axial symmetry to substantially coincide with the secondary vortex flow in an integral manner to avoid or even eliminate turbulence. The open interface between the spiral inlet channel 85 and the distribution chambers 89, 89A into the housing sections 88, 80A also provides advantageously a large driving interface between the primary and secondary flows to thereby efficiently transmit the torque impulse from the primary flow to the secondary flow. FIG. 28 illustrates how the inlet channel 85 spirally encircles the chamber formed by the elements 88, 88A, 89, 89A.

Figures 29, 30:
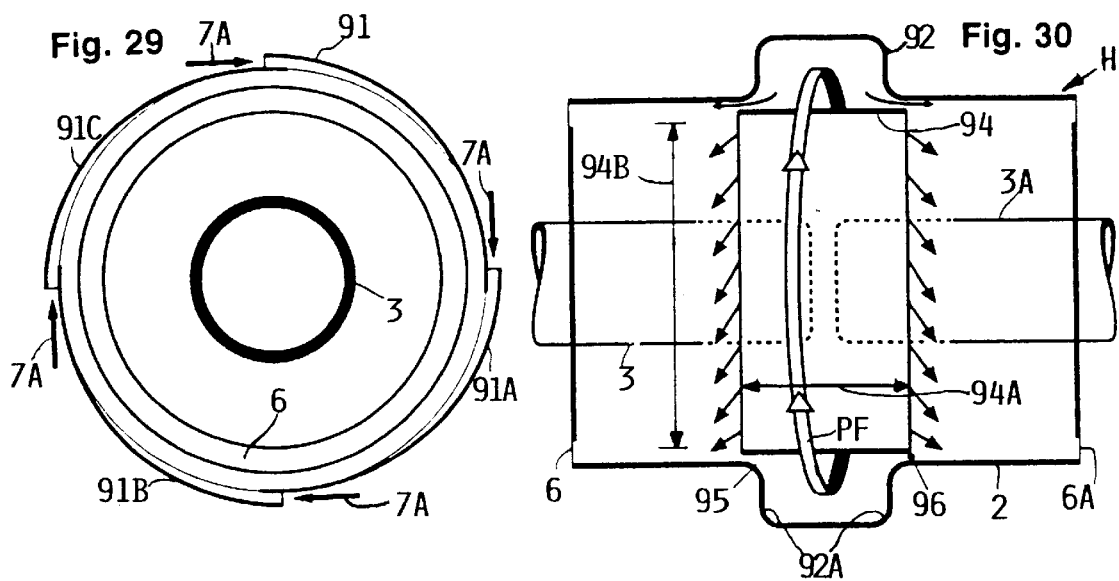
FIG. 29 is a view similar to that of FIG. 28, but showing four spiral inlet sections circumferentially spaced around the separator housing.
FIG. 30 shows a sectional view of a separator housing with a circumferential inlet housing section of rotational symmetry around a primary flow guide cylinder jacket in an inlet area.

FIG. 29 shows spiral housing sections 91, 91A, 91B, 91C of limited circumferential length so that each section covers in spiral fashion a limited angular range around the chamber.

Figure 31:
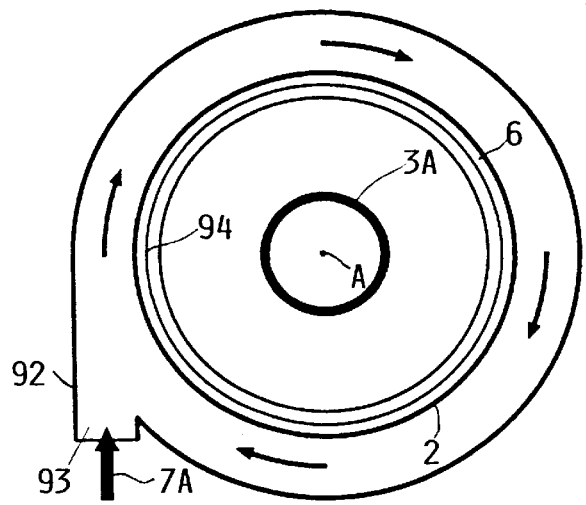
FIG. 31 shows a central section in a radial plane and in the direction of the longitudinal chamber axis (A) through the separator of FIG. 30.

FIGS. 30 and 31 show an inlet 92 in the form of a ring housing of rotational symmetry around the housing H. The inlet 92 has an entrance 93 extending tangentially to the cylinder defined by the housing wall 2. The corners 92A of the inlet 92 are rounded to improve the flow dynamics of the primary flow. An internal hollow guide cylinder 94 is mounted, for example, by spokes not shown, in radial alignment the ring housing of the inlet 92 that surrounds the cylinder 94 with a circumferential gap between the cylinder 94 and the inlet 92. The cylinder 94 has an axial length 94A and a diameter 94B so selected that ring nozzles 95 and 96 are formed which provide an axially symmetric entrance of the primary flow into the right and left vortex chamber sections. Thus, the driving primary flow PF merges smoothly into the driven secondary vortex flow in the housing H with an axial symmetry relative to the central radial plane CRP. The tangential primary flow 7A through the entrance 93 exits through the ring nozzles 95, 96 and applies the required torque moment to the secondary flow inside the chamber as indicated by the arrows in FIGS. 30 and 31. Thus, axially symmetric circumferential velocity components of the primary flow merge without turbulence into the secondary vortex flow to drive the latter with minimal losses.

Figure 32:
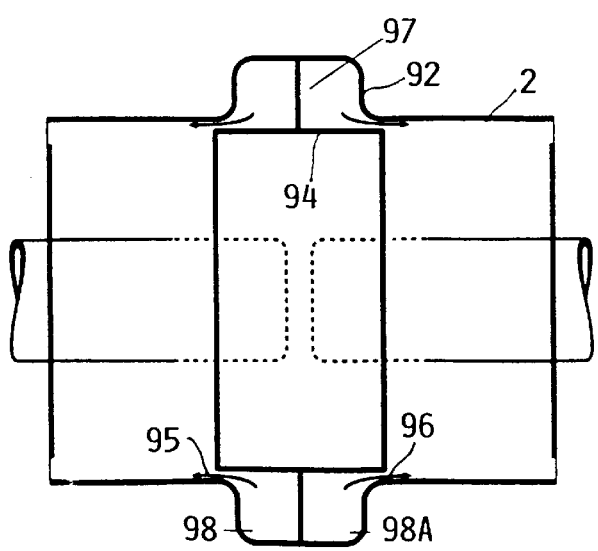
FIG. 32 is a view similar to that of FIG. 30, and showing a ring plate for mounting the primary flow guide cylinder jacket.

FIG. 32 shows an embodiment similar to that of FIG. 30, however, with the addition of a separation ring wall 97 that divides the housing of the flow inlet 92 into two ring chambers 98, 98A. The separation wall 97 serves for mounting the cylinder 94 symmetrically in the housing to provide the ring nozzles 95 and 96. The ring wall 97 is centrally positioned and divides the primary flow into two symmetrical primary flow portions passing through the ring nozzles 95, 96 as indicated by the arrows.

Figure 33:
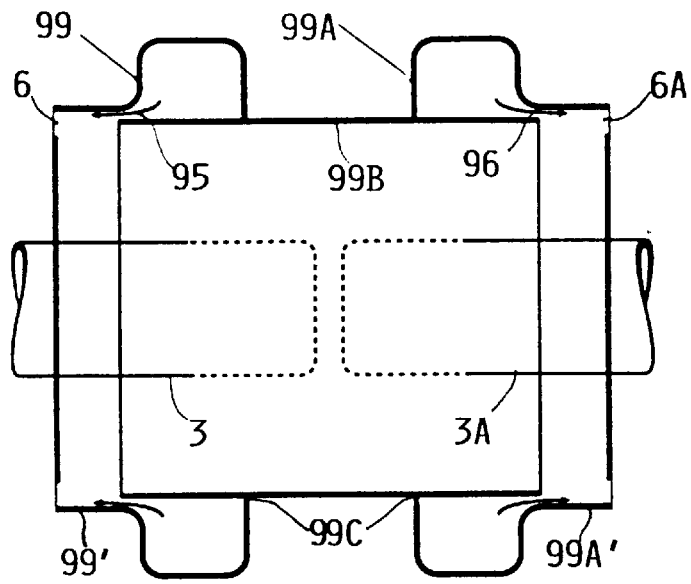
FIG. 33 is a modification of the embodiment of FIG. 32, having two mirror-symmetrical individual housing sections with respective inlets for two primary flows.

FIG. 33 shows an embodiment similar to that of FIG. 32. The two chambers 98, 98A are formed by two separate inlet housing sections 99, 99A connected to a common hollow cylinder 99B at 99C. The immersion pipes 3, 3A reach through end walls of each housing section 99, 99A into the cylinder 99B which has such an outer diameter that the ring nozzles 95, 96 are formed.

Figure 34:
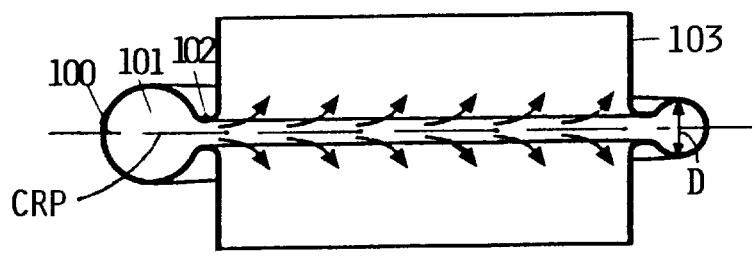
FIG. 34 shows an axial sectional view through a separator housing with an inlet channel formed by a spiral inlet housing having a circular cross-section that decreases in its diameter away from an entrance cross-section.
Figure 35:
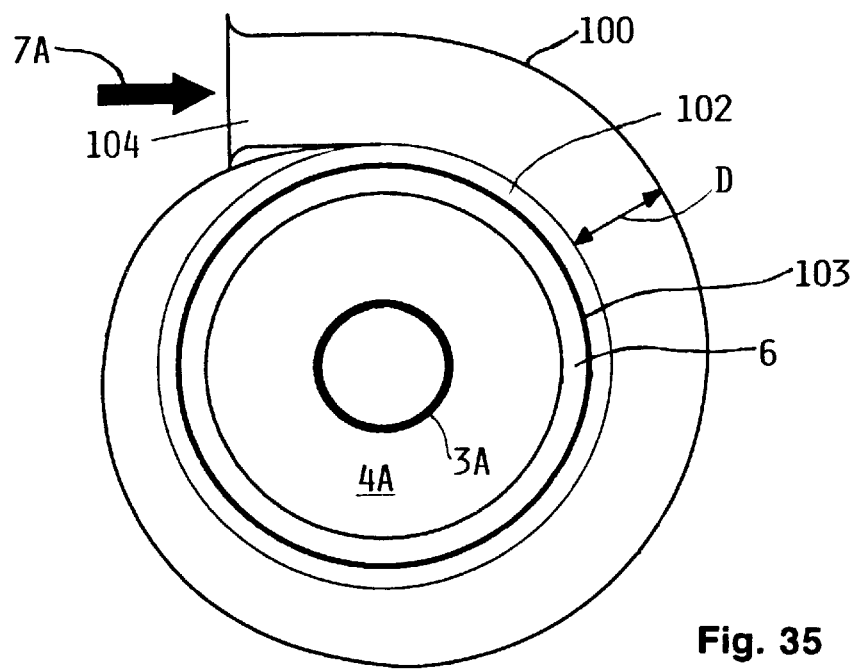
FIG. 35 shows an end view in the direction of the longitudinal chamber axis of the embodiment of FIG. 34.

FIG. 34 shows a sectional axial view through the center portion of a circular cylindrical chamber 103 and FIG. 35 shows an end view perpendicularly to the longitudinal axis of the complete chamber 103 with a spiral inlet housing 100 having a circular cross-section 101 with a diameter D decreasing circumferentially around the chamber 103 away from the inlet entrance 104 as seen in FIG. 35. The inlet housing 100 is open radially inwardly into a circular intermediate ring channel 102 between the inlet housing 100 and the chamber 103. The ring channel 102 has an axial width smaller than the smallest diameter D. The channel 102 functions as a flow compensator which passes the primary flow out of the spiral inlet housing 100 into the chamber 103. The primary flow 7A enters the ring channel 102 with rotational symmetry around the entire circumference and with uniform radial and circumferential flow velocity components. The transitions between the spiral inlet housing 100 and the flow compensating intermediate channel 102 are rounded to avoid turbulence. Similarly, the transitions of rotational symmetry between the channel 102 and the circular cylindrical chamber 103 are rounded to avoid turbulence. The tangential inlet entrance 104 guides the primary flow with the required torque moment into the spiral inlet housing 100, thereby producing the circumferential flow velocity components. The spiral configuration of the housing 100 with its circumferentially diminishing diameter D provides the required radially extending flow velocity components. Due to the guiding effect of the channel 102 the radial flow velocity components continue through the compensating channel 102 all the way to the transition between the channel 102 and the chamber 103 whereby the continuity of the radial velocity components is advantageously influenced. This radial continuity influence diminishes toward the transition between the channel 102 and the chamber 103 down to zero. In this manner the initially radially oriented flow is converted more and more into an axially oriented meridian flow as indicated by the arrows in FIG. 34, whereby the circumferential flow velocity components increase as the diameter D of the in the housing 100 diminishes in the circumferential direction away from the entrance 104. The chamber 103 extends with axial symmetry, mirror-symmetrically away from the central radial plane CRP. Therefore, the conversion of the radial flow components into axial flow components takes places symmetrically, thereby forming two axial flows with two axially symmetric flow volumes of equal size. Thus, the rotationally and axially symmetric adaptation of the primary flow congruently to the secondary vortex flow takes place with an integral driving effect on the secondary vortex flow.

FIG. 36 shows a vortex chamber 225 with a straight peeling slot 107 extending in parallel to the longitudinal central axis A. Immersion pipes 110, 110A are arranged so that they do not protrude with their discharge ends from end walls of the chamber 225. However, the discharge ends of the immersion pipes 110, 110A are rounded at 111 to merge into the end walls 109, 109A with a smooth transition. The housing corners 228 are also rounded for an improved flow of the secondary vortex flow inside the chamber radially inwardly along the end walls 109, 109A toward the immersion pipes 110, 110A. A flow pipe inlet 7' is positioned centrally between the ends of the vortex chamber as described above.

FIG. 37 shows a side view of chamber 225 as viewed in the direction of arrow A37 in FIG. 38. The peeling slot 107 with its end walls 112 is positioned approximately 180° opposite the inlet 7', as seen in FIG. 38, for removing heavy particles 107'. Advantageously the peeling slot 107 is simply a cut and drawn or stamped portion of the wall of the cylindrical jacket of the chamber 225. As seen in FIG. 36 the peeling slot 107 reaches approximately from the curvature 111 at one end of the chamber to the opposite curvature 111 at the other end of the chamber and the peeling slot 107 is an integral wall portion of the chamber 225. The wall portion forming the slot 107 is bent radially outwardly and tangentially to the housing circumference as seen in FIG. 38.

FIG. 39 shows perspectively a modification of a vortex chamber 225A according to the invention with a peeling slot 113 having a V-shape. The end view of FIG. 40 shows that the peeling slot 113 is covered by a tangential housing wall portion 114 and by a circumferential guide portion 232. The housing wall portion 114 is simply bent radially outwardly. It is not always necessary that the ends of the slot 113 are closed, as will be explained below. Further, the V-shape of the peeling slot 113 could be replaced by a curved configuration. The V-shape or the curved slot configuration will be selected depending on manufacturing considerations. In both instances the peeling slot 113 is advantageously adaptable to an efficient separation of heavy particles that are peeled off from the secondary axially symmetric vortex flow in the chamber next to the inner surface of the chamber wall.

In embodiments of the invention comprising a plurality of such chambers 225 mounted in perforated plates 112' shown in FIG. 37, it is possible to use the perforated mounting plates 112' as closures for closing the axially facing ends of the peeling slot or slots 107 and 113 by abutting the ends of the bent out chamber wall portion 114 against the plates 112', whereby the ends of the wall portion 114 and the ends of the guide portion 232 form axial and radial stops for the mounting plates 112' shown by two dashed lines in FIG. 37. Both, the chamber wall portion 114 and the guide portion may be bent out of the chamber wall. However, the guide portion 232 may be a separate member attached to the wall portion 114. The wall portions 114 and 232 are so positioned that the peeling slot 113 has a constant width in the radial direction along its entire slot length between the end walls 112 or 112'.

Figure 41:
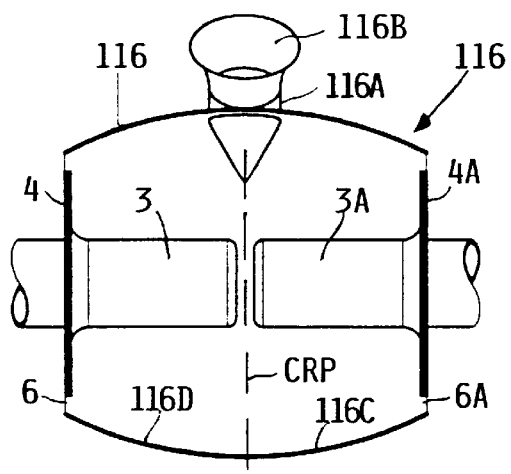
FIG. 41 is a schematic longitudinal section of a separator housing having a barrel-shape.
Figure 42:
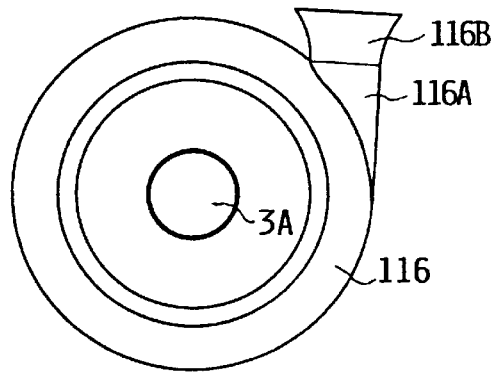
FIG. 42 is an end view of the chamber of FIG. 41.

FIGS. 41 and 42 show an embodiment in which a housing 116 enclosing a vortex chamber, has a barrel-shaped configuration. The inlet 116A is formed of a pipe section having a nozzle inlet 116B for accelerating the primary flow into the chamber. The barrel-shaped housing 116 has two housing sections 116C and 116D arranged mirror-symmetrically relative to the central radial plane CRP. These housing sections 116C and 116D may also have the shape of a frustum with the larger frustum ends facing each other. The smaller barrel ends or the smaller frustum ends form the chamber end walls 4, 4A with the discharge gaps 6, 6A. The just described construction of the housing 116 provides a larger penetration depth of the primary flow in the circumferential direction into the housing 116, whereby an improved conversion of the tangential impulse is achieved for driving the secondary vortex flow inside the chamber because the fanning-out of the primary flow takes place over a larger circumferential range. Such larger fanning-out further increases the separator capacity and hence the efficiency. The wall of the housing 116 can also be provided with a peeling slot for the heavier phase instead of or in addition to the shown discharge gaps 6, 6A.

Figure 43:
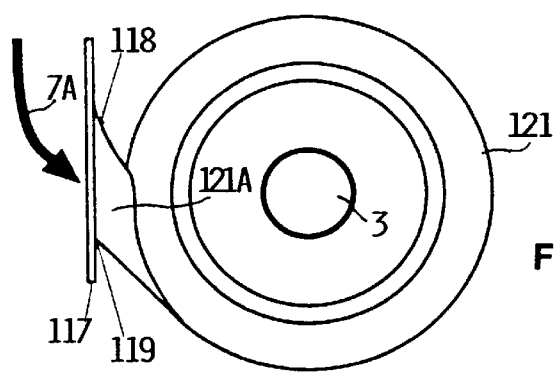
FIG. 43 is a view similar to that of FIG. 42 but showing a separator housing mounting flange around the inlet.
Figure 44:
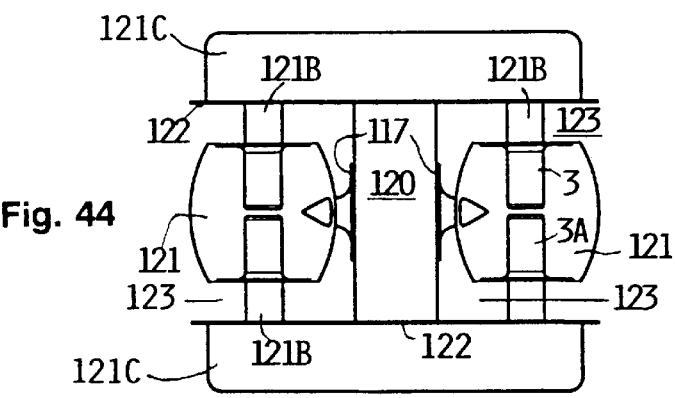
FIG. 44 is an elevational view of a modular separator with several barrel-shaped separator housings.

FIG. 43 illustrates an end view of a barrel-shaped chamber 121 with a pipe inlet 121A provided with a mounting flange 117 for connection to a raw gas supply channel 120 shown in FIG. 44. The pipe inlet 121A has a smoothly curved guide surface 118 for the inlet flow 7A and a flow facing edge 119. The guide surface 118 smoothly merges into the flange 117 for avoiding turbulence thereby reducing flow losses of the primary flow entering the chamber 121. Similarly, the relatively sharp edge 119 reduces flow losses. The smoothly rounded guide surface 118 and the relatively sharp edge 119 merge circumferentially into the inlet pipe 121A to minimize turbulent flow coming through the supply channel 120 into the inlet pipe 121A. The just described flange mounting of a plurality of chambers 121 to the channel 120 does not adversely affect the separation capacity of the individual chambers. This flange mounting has the advantage of structural simplicity so that the chambers with their flanged inlets can be efficiently manufactured in a mass production operation. Further, the flanges 117 combined with mass producing the chambers permit mounting a plurality of the same type of chambers to the same channel 120. This construction has the further advantage that modular construction techniques may be employed to assemble a plurality of chambers 121 in a module as shown in FIG. 44.

FIG. 44 shows a module with a plurality of chambers 121 connected with their flanges 117 to the raw gas supply channel 120 which has, for example, a square cross-section and functions as a support column for the chambers 121. The immersion pipes 3, 3A of the chambers 121 are provided with pipe extensions 121B that lead into clean gas collectors 121C through mounting walls 122 which in turn are rigidly connected to the channel 120 functioning as a support column. The support walls 122 are larger in surface area than the clean gas collectors 121C so that further modular units can be installed between these support walls 122. The pipe extensions 121B provide sufficient space 123 for the collection of dust through the gaps 6, 6A in the end walls of all the chambers 121. Each support wall 122 carries all the immersion pipe extensions 121B on the respective ends of the plurality of chambers 121. The rigid connection of the mounting walls 122 to the channel 120 in combination with the interconnection of the support walls 122 through the immersion pipe extensions 121B results in a rugged, yet lightweight construction due to the box-shaped support column formed by the channel 120 made, for example of sheet metal. The chambers 121, immersion pipes 3, 3A and the pipe extensions 121B are also made of sheet metal and provide a high stiffness for each modular unit. The end walls 4, 4A are rigidly connected to the housing wall through spokes or the like not shown, whereby many connections through the chambers 121 are provided between the support walls 122 in addition to the connection through the channel 120.

Figure 46:
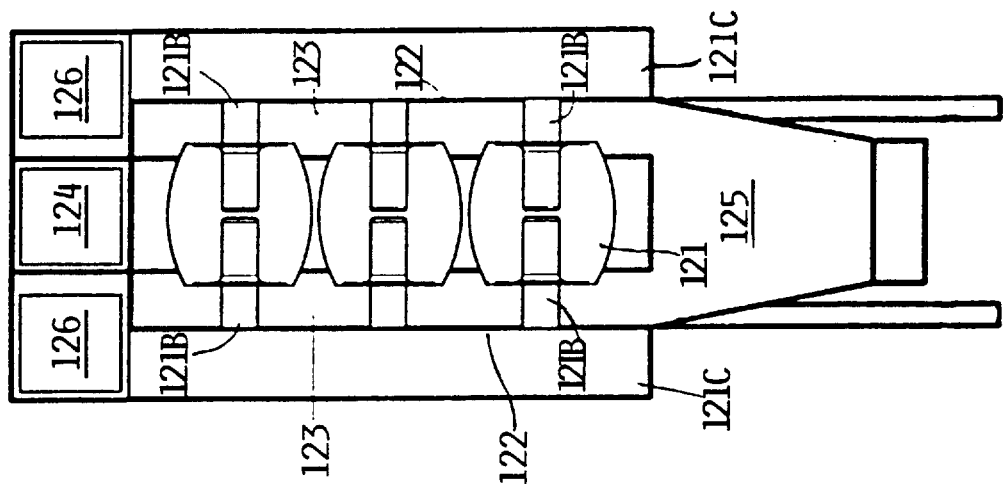
FIG. 46 is a side view of the system of FIG. 45.
Figure 45:
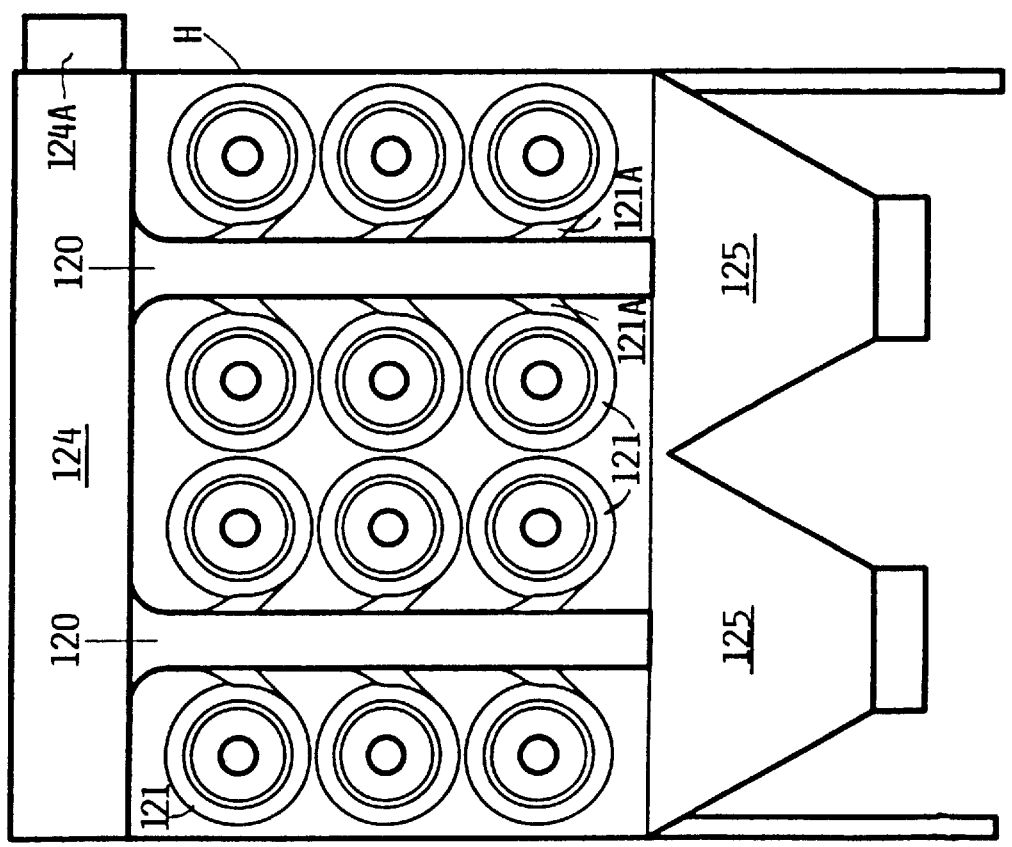
FIG. 45 is an elevational side view of a separator system with a plurality of separator housings arranged in columns.

FIGS. 45 and 46 show a side view and an elevational view of a chamber module according to FIG. 44, whereby two supply channels 120 hold two modular units each comprising six chambers 121 held in a compact housing H at three levels. Each supply channel 120 is connected into a raw gas distribution main channel 124 having a raw gas inlet 124A. The main channel 124 is mounted on top of the housing H centrally between two clean gas collecting ducts 126 connected to modular clean gas collectors 121C as best seen in FIG. 46. Arranging the collector ducts 126 and the raw gas supply channel 124 on top of the housing H provides sufficient space 123 in the housing H for collecting dust in collector funnels 125 that are connected to dust containers not shown. The total height of the cleaning system can be reduced by providing a plurality of collecting funnels 125 as shown in FIG. 45. The clean gas collectors 121C connect all the chambers 112 in parallel with each other.

FIGS. 47 and 48 show a construction similar to that of FIGS. 41 and 42 except that in FIGS. 47 and 48 the chamber 121 is provided with a curved peeling slot PS. The use of a peeling slot further facilitates a compact construction or assembly of a large number of individual chambers 121 in a housing H, wherein the individual chambers are mounted by separator wall sections 130, 131 forming raw gas distribution chambers 127 and dust collecting spaces 128 in the housing H as best seen in FIG. 49.

In FIG. 49, raw gas inlets 132, 133 lead into the chambers 127. The raw gas inlets 132, 133 are connected to distribution ducts not shown and the raw gas 7A is transported by suction fans out of the distribution ducts into the distribution chambers 127. The peeling slots PS open into the dust collecting spaces 128. For this purpose the peeling slots PS of neighboring groups of chambers face each other as shown in FIG. 49. The raw gas inlets 116B are positioned in the chambers 127 in which the raw gas is distributed into each of the inlets 116B in series. The separator wall sections 130, 131 mount the individual chambers in series. Such an arrangement provides a compact multi-chamber cleaning system of relatively small structural height.

FIG. 50 shows the immersion pipes 3, 3A and chamber end walls 4, 4A mounted in perforated wall sections 129. The outlets of the immersion pipes are aligned with perforations in the walls 129 to discharge the clean gas into two clean gas collecting ducts 134 leading into a respective clean gas outlets 135. Dust is discharged through collector funnels 128A out of the spaces 128 into collector bins not shown. The clean gas collector chambers 134 simultaneously function as settling chambers.

FIG. 51 shows a sectional view toward section plane 51—51 in FIG. 54 through a multi-level, multi-chamber cleaning system comprising four individual separator chambers C at each level in a stack in a housing H. Raw gas is supplied through a central hollow column 136 around which four individual chambers C are arranged to receive the raw gas through flange mounted inlets describe above. Further, liquid distribution pipes 140, 141 are mounted in the column 136. The pipes 140, 141 will be described in more detail below with reference to FIG. 52. Each of the chambers C is provided with axially facing dust discharge gaps 6, 6A that discharge the collected dust into spaces 138 in the housing H. The clean gas out of the immersion pipes 3, 3A is collected in channels 137 mounted in corners of the housing H.

Referring to FIGS. 51 and 52, the individual chambers are mounted with the flange 117 with their inlets I to the raw gas supply column 136 functioning as a support column for all the chambers C which are further rigidly interconnected through their immersion pipes 3, 3A with the clean gas collecting channels 137 which are connected to the housing H. Sufficient space 138 is provided between the dust outlet gaps 6, 6A and the channels 137 for collecting the dust in these spaces 138. The dust is discharged through collector funnels not shown in FIG. 51. The just described construction is also very compact, yet rugged due to the central support column and the multiple interconnections through the chambers 3, etc.

FIG. 52 shows one liquid distribution pipe 140 equipped with a discharge nozzle 139 for spraying a liquid such as water in the form of fine droplets or as a mist into each inlet I of the respective chamber C. The water droplets enhance the collection of dust particles in chamber C, which thus becomes a wet separator chamber having an increased separating capacity compared to chambers of equal size but working with a dry vortex separation rather than with a wet vortex separation. This increase of the separation capacity in a wet separation is due to the fact that the dust particles agglomerate with the help of the liquid droplets to form heavier particles that can be more easily separated with less vortex flow energy.

Basically it is possible to equip any of the present chambers having different types of inlets with injection nozzles for spraying a liquid into the raw gas flow to be cleaned. The vaporization and introduction of liquid droplets can take place at different positions upstream of the inlet and not necessarily at the inlet itself. The droplet injection may take place upstream of the inlets in distribution housings, such as settling chambers, pipes and pipe or duct systems. This introduction of liquid droplets outside the actual inlet applies to individual chambers, to chamber modules, and to multi-chamber systems. The injection nozzles may distribute the liquid droplets in a conical shape in the gas flow direction or in a counter current direction. Further, one or a plurality of injection nozzles may be arranged in parallel to the flow direction in gas flow cross-sectional areas which receive the raw gas through pipelines or pipeline distribution systems.

In FIG. 53 the pipe 140 with its nozzle 139 is positioned so that the sprayed droplets DR will be entrained by the primary flow 7A to fill substantially the entire cross-sectional area of the primary flow in the inlet. This can be achieved by positioning the nozzle 139 as shown to spray in the flow direction. The same effect can be achieved by positioning the nozzle 139 to spray in a direction opposite to the flow direction of the primary flow 7A. One or several pipes with respective nozzles may be arranged to spray in the flow direction or opposite thereto. In FIG. 53 the nozzle 139 sprays the droplets DR in the flow direction and in a pattern having a conical tip toward the nozzle 139 and fanning out in the flow direction, whereby the entraining forces of the primary flow 7A distribute the droplets throughout the entire inlet cross-sectional area.

FIG. 54 shows a wet separation tower with a plurality of individual chambers C forming a single module shown in section in FIG. 51. Three levels of chambers C are mounted to the hollow central support and supply column 136 that simultaneously provides the inlet flow of the raw gas and a space for the central spray liquid supply pipe 141 substantially as shown in FIG. 51. A total of twelve chambers C are assembled in the tower housing H of FIG. 54. A raw gas inlet RGI is connected to the top of the column 136. Preferably, the central pipe 141 has sections 141A each carrying four pipes 140 each with its nozzle 139, as best seen in FIG. 51. The suspension of dust particles in the liquid is collected in a chamber 142 arranged below the tower of chambers C. Preferably, the column 136 has a lower extension 136A that reaches with its open end 144 below the liquid level 143. Thus, the lower end of the column 136 is sealed by the liquid in the chamber 142. By immersing the column open end 144 in the liquid in the chamber 142 the advantage is obtained that liquid droplets which have accumulated dust already in the column 136 and have become heavy enough not to be blown into the chambers C, can fall down inside the column 136 directly into the collecting chamber 142 which may function as a settling or sedimentation chamber to be pumped out through a port 145. Thus, the column 136 with its open end 144 extending over the entire cross-section of the column 136 acts as a preliminary separator cooperating with the same single collecting chamber 142 as the separator chambers C. The dust from the separator chambers C is discharged through the gaps 6 and collected in the chamber 142.

Any of the above described chambers may be equipped with end gaps 6, 6A and/or with peeling slots such as 113 for the removal of the dust particles into spaces 138. However, peeling slots preferably lead into a discharge channel or remainder raw gas flow channel that may be returned into the main channel for repeated transition through the respective separating chamber.

The industrial application of this invention relates to all situations where heavier phases are to be separated from lighter phases in a fluid flow. Wherever dust is generated such as in mines, by chimneys, cleaning operations, etc. the present separators can be used with advantage due to the compact size and due to the ability to handle any volumes large or small of raw fluid flow. The adaptation of any volume of raw fluid flow to be cleaned is easily accomplished by the combination of any number of smaller vortex chambers in modular form to assemble cleaning systems of any size.

Although the invention has been described with reference to specific example embodiments, it will be appreciated that it is intended to cover all modifications and equivalents within the scope of the appended claims.

What is claimed is:

1. A method for separating different material phases having different densities that can be separated from each other by centrifugal force in a separator housing having a central radial plane, comprising the following steps:

(a) feeding a primary flow containing said different material phases symmetrically to said central radial plane and tangentially into said separator housing for forming a primary fanned-out flow pattern that is fanning-out mirror-symmetrically to said central radial plane, (b) generating in said housing with said primary flow a secondary flow mirror-symmetrically to said central radial plane by fanning-out said primary flow into said secondary flow, said secondary flow including two vortex secondary flow half portions (11) which together form a secondary fanned-out flow pattern flowing mirror-symmetrically away from said central radial plane along an inner surface of said separator housing, and (c) mirror-symmetrically superimposing said primary fanned-out flow pattern on said secondary fanned-out flow pattern so that said primary flow moves in the same directions as said two vortex secondary flow half portions.

2. The method of claim 1, wherein flow velocity differences between said primary fanned-out flow pattern and said secondary fanned-out flow pattern are minimized, whereby said fanned-out primary flow pattern merges into said secondary flow pattern substantially without turbulence.

3. The method of claim 1, wherein flow velocity gradients within said primary flow are minimized.

4. The method of claim 1, further comprising spraying a liquid into said primary flow pattern.

5. In an apparatus for performing the method of claim 1 of separating said different material phases intermixed in said primary flow from each other, wherein said separator housing (H) has an axial wall (2) and radial end walls (4, 4A) enclosing a separator chamber (1; C, 116, 121) with a central longitudinal axis (A) and an axial chamber length (ACL), immersion pipes (3, 3A) reaching centrally from opposite chamber ends into said separator chamber with a central spacing (5) between inner ends of said immersion pipes for discharging a lighter phase through said immersion pipes out of said separator chamber, a discharge (6, 6A; 107, 113) out of said chamber for removing a heavier phase, said separator housing (H) further having at least one flow inlet (7) penetrating said axial chamber wall (2) for feeding said primary flow through said inlet (7) to generate said secondary flow pattern in said separator chamber, the improvement comprising two mirror-symmetrical chamber sections and two mirror-symmetrical inlet sections positioned mirror-symmetrically relative to said central radial plane (CRP) for said feeding, said two mirror-symmetrical sections of said flow inlet (7) fanning-out with an axial inlet length (AIL) that increases in a circumferential direction for mirror-symmetrically superimposing said primary flow pattern on said secondary flow pattern, said flow inlet having a radial inlet depth (RID) that decreases in said circumferential direction for mirror-symmetrically merging said primary flow pattern into said secondary flow pattern in said separator chamber substantially without turbulence.

6. The apparatus of claim 5, wherein said axial inlet length (AIL) and said radial inlet depth (RID) satisfy the condition:

$$l \geq RID/AIL \geq 0.01.$$

7. The apparatus of claim 5, wherein said flow inlet (7) comprises at least one primary flow guide channel for causing said fan-out pattern of said primary flow.

8. The apparatus of claim 7, wherein said primary flow guide channel comprises a flow cross-sectional area (8) selected from the group of substantially rectangular flow cross-sectional areas, substantially square flow cross-sectional areas, substantially oval flow cross-sectional areas, circular flow cross-sectional areas, semicircular cross-sectional areas, and at least in part curve bounded cross-sectional areas.

9. The apparatus of claim 7, wherein said primary flow guide channel comprises a flow guide bottom (83) that is straight in the flow direction of said primary inlet flow.

10. The apparatus of claim 7, wherein said primary flow guide channel comprises a flow guide bottom (84) that is radially curved in at least a radial direction crosswise to said flow direction of said primary flow.

11. The apparatus of claim 7, wherein said primary flow guide channel comprises a flow guide bottom (84) that is curved in the flow direction of said primary flow.

12. The apparatus of claim 7, wherein said primary flow guide channel has a channel wall that is an integral part of said axial wall (2) of said separator housing, said primary flow guide channel being formed by a drawing or punching operation, and an inlet gap (33) between said channel wall and said axial wall (2) of said separator housing.

13. The apparatus of claim 12, wherein said primary flow guide channel comprises a channel bottom (59) formed as a tongue (57) punched out of said axial wall (2, 63) of said separator housing.

14. The apparatus of claim 12, further comprising at least one support (64, 70) positioned in said inlet gap (33) between said channel bottom and said axial wall (2) of said separator housing, said support (64, 70) having a first end connected to said channel bottom and a second end connected to said axial wall of said separator housing.

15. The apparatus of claim 14, wherein said support (70) comprises a triangular configuration, one side of said triangular configuration being connected to said channel bottom and one corner of said triangular configuration being connected to said axial wall (2).

16. The apparatus of claim 7, wherein said primary flow guide channel comprises a channel member (46, 54) cut from sectional stock having an open longitudinal side.

17. The apparatus of claim 7, wherein said primary flow guide channel comprises a channel bottom having a V-cross-sectional configuration, (FIG. 21).

18. The apparatus of claim 7, wherein said primary flow guide channel comprises a channel bottom having a slot (65) therein, (FIG. 19).

19. The apparatus of claim 5, wherein said axial wall (2) of said separator housing has a configuration of rotational symmetry around said longitudinal axis (A), and wherein said apparatus comprises a plurality of drawn or punched inlets centrally positioned in and penetrating said axial wall (2) of said separator housing, said inlets being spaced from said end walls and mirror-symmetrically arranged relative to a central radial plane (CRP) extending perpendicularly to said longitudinal axis (A) centrally through said central spacing (5).

20. The apparatus of claim 5, further comprising a hollow cylinder (94) positioned in said separator housing.

21. The apparatus of claim 20, wherein said separator housing comprises two separator housing sections (99, 99A) arranged mirror-symmetrically relative to each other and relative to said central radial plane (CRP) around said hollow cylinder.

22. The apparatus of claim 5, wherein said separator housing has a spiral cross-sectional configuration.

23. The apparatus of claim 5, wherein said separator housing further comprises a peeling slot (107, 113, PS) in said housing wall for removing a heavier phase.

24. The apparatus of claim 5, wherein said separator housing has a configuration selected from a barrel shape, a cylinder shape, a double frustum shape, and a double frustum shape with a cylinder section between two frustums.

25. The apparatus of claim 5, Therein said flow inlet comprises at least one step (72, 75) over which said primary driving flow must pass to form at least one lateral vortex flow (74) along said primary driving flow.

26. The apparatus of claim 5, wherein said flow inlet comprises a spiral-shaped inlet housing (85, 100) extending circumferentially around said separator housing.

27. The apparatus of claim 26, wherein said spiral-shaped flow inlet housing (85, 100) has a cross-sectional flow area that decreases circumferentially away from an entrance cross-sectional flow area (86, 104).

28. The apparatus of claim 26, further comprising a compensating channel (102) between said spiral-shaped inlet housing (100) and said separator housing (103).

29. The apparatus of claim 5, further comprising a mounting flange (117) secured to and surrounding said flow inlet (I).

30. The apparatus of claim 5, wherein said flow inlet comprises an injection nozzle forming a nozzle inlet (116B) for injecting said primary flow into said separator chamber.

31. The apparatus of claim 5, further comprising at least one nozzle (139) for spraying a liquid into said primary flow.

32. The apparatus of claim 31, comprising a plurality of separation chambers, at least one distribution column (136) for said different material phases, said flow inlets of said separation chambers being connected to said distribution column (136), and wherein said at least one nozzle is mounted in said distribution column.

* * * * *